US 8,311,273 B2

(12) United States Patent
Ikeda

(10) Patent No.: US 8,311,273 B2
(45) Date of Patent: Nov. 13, 2012

(54) OBJECT DETECTION BASED ON DETERMINATION OF PIXEL STATE

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1078 days.

(21) Appl. No.: 11/806,778

(22) Filed: Jun. 4, 2007

(65) Prior Publication Data

US 2007/0280540 A1  Dec. 6, 2007

(30) Foreign Application Priority Data

Jun. 5, 2006  (JP) .................................. 2006-155977

(51) Int. Cl.
*G06K 9/00* (2006.01)
*G06K 9/34* (2006.01)

(52) U.S. Cl. ........................................ 382/103; 382/173

(58) Field of Classification Search .................. 382/103, 382/173

See application file for complete search history.

(56) References Cited

U.S. PATENT DOCUMENTS

| 5,606,376 | A | * | 2/1997 | Shinohara | 348/701 |
| 5,638,116 | A | * | 6/1997 | Shimoura et al. | 348/118 |
| 5,729,302 | A | * | 3/1998 | Yamauchi | 348/699 |
| 6,125,145 | A | * | 9/2000 | Koyanagi et al. | 375/240.16 |
| 6,424,370 | B1 | * | 7/2002 | Courtney | 348/143 |
| 6,542,621 | B1 | * | 4/2003 | Brill et al. | 382/103 |
| 6,661,918 | B1 | * | 12/2003 | Gordon et al. | 382/173 |
| 6,731,799 | B1 | * | 5/2004 | Sun et al. | 382/173 |
| 6,870,945 | B2 | * | 3/2005 | Schoepflin et al. | 382/103 |
| 6,985,172 | B1 | * | 1/2006 | Rigney et al. | 348/149 |
| 7,136,525 | B1 | * | 11/2006 | Toyama et al. | 382/173 |
| 7,436,887 | B2 | * | 10/2008 | Yeredor et al. | 375/240.01 |
| 7,450,782 | B2 | * | 11/2008 | Lim et al. | 382/284 |
| 7,489,817 | B2 | * | 2/2009 | Toyama et al. | 382/173 |
| 7,526,102 | B2 | * | 4/2009 | Ozer | 382/103 |
| 7,825,954 | B2 | * | 11/2010 | Zhang et al. | 348/169 |
| 2003/0048926 | A1 | * | 3/2003 | Watanabe | 382/103 |
| 2004/0126014 | A1 | * | 7/2004 | Lipton et al. | 382/173 |
| 2004/0151342 | A1 | * | 8/2004 | Venetianer et al. | 382/103 |

(Continued)

FOREIGN PATENT DOCUMENTS

JP  7-31732  4/1995

(Continued)

OTHER PUBLICATIONS

Japanese Office Action dated Jun. 8, 2010, with partial English translation.

*Primary Examiner* — Wenpeng Chen
(74) *Attorney, Agent, or Firm* — McGinn IP Law Group, PLLC

(57) ABSTRACT

An object detecting apparatus and method includes a pixel state determining unit that derives variance value for temporal properties of pixel characteristics of an input image, background model generating unit that adaptively generates a background model from characteristics in the characteristic storing unit and characteristic storing unit for background model generation using the characteristic distance and the pixel state determined as conditions, and an object judging unit that judges an object based on a characteristic distance indicative of a degree of similarity between a generated background model and pixel characteristics of an input image.

38 Claims, 12 Drawing Sheets

U.S. PATENT DOCUMENTS

| | | | |
|---|---|---|---|
| 2006/0165283 A1* | 7/2006 | DeWitt et al. | 382/173 |
| 2006/0222205 A1* | 10/2006 | Porikli et al. | 382/103 |
| 2006/0268128 A1* | 11/2006 | Miwa | 348/234 |
| 2008/0166045 A1* | 7/2008 | Xu et al. | 382/170 |
| 2008/0181453 A1* | 7/2008 | Xu et al. | 382/103 |
| 2010/0045799 A1* | 2/2010 | Lei et al. | 348/169 |

FOREIGN PATENT DOCUMENTS

| | | |
|---|---|---|
| JP | 2002-32760 | 1/2002 |
| JP | 2004-227527 | 8/2004 |
| JP | 2004-258927 | 9/2004 |
| JP | 2004-265292 | 9/2004 |
| JP | 2006-59183 | 3/2006 |

* cited by examiner

OBJECT DETECTION BASED ON DETERMINATION OF PIXEL STATE

REFERENCE TO RELATED APPLICATIONS

The present application is claiming the priority of the earlier Japanese patent application No. 2006-155977 filed on Jun. 5, 2006, the entire disclosure thereof being incorporated herein by reference thereto.

FIELD OF THE INVENTION

The present invention relates to an object detecting apparatus, a method for detecting an object, and an object detection program, and particularly to an object detecting apparatus, a method for detecting an object, and an object detection program that detects an object by generating a background model from a moving picture.

BACKGROUND OF THE INVENTION

An object detecting apparatus, a method for detecting an object, and an object detection program are used to detect a target object. As conventional technologies, techniques such as the background subtraction method and inter-frame subtraction method are known. In the background subtraction method, a target object is detected by subtracting a background image, which does not include the target object, from an input image. The background subtraction method is able to detect moving or stationary target objects well, however, an accurate background image that does not include the target object must be provided. Further, when the background changes due to shifts in ambient light, it becomes difficult to obtain an accurate detection result.

In the inter-frame subtraction method, a target object is detected by differentiating frame images of an input image in a certain time interval. Unlike the background subtraction method, an accurate background image that does not include the target object does not have to be prepared, and slow background changes such as shifts in ambient light do not become an issue in the inter-frame subtraction method. However, there is a possibility that only a part of the target object is detected because of the way it works. Further, it is difficult to detect a target object not in motion since there is no inter-frame changes.

As a method for solving the problems of the background subtraction method, there is a method in which the background image is updated one after another (for instance, refer to Patent Document 1.) In Patent Document 1, a method in which the background is updated one after another by a simple addition method is disclosed. In this method, a target object is detected by performing the background subtraction method using the updated background image. It is not necessary to prepare an accurate background image that does not include the target object since the background image is updated one after another by the simple addition method. Therefore, slow background changes such as shifts in ambient light do not become an issue. However, when the target object stands stationary, or moves slowly, it becomes difficult to detect the target object because the target object is updated into the background image. Further, continuous background changes such as the swaying of trees and ripples of water present a problem since it is difficult to update the background image.

As a method for solving the problems of the method described in Patent Document 1, a method disclosed in Patent Document 2 can be used. In the method described in Patent Document 2, the variance value of the intensity is derived for a particular past interval and a particular future interval in certain point of time, and by providing threshold values for these variance values, pixel states are distinguished into a "moving state," "transition state," "person candidate," and a "background." Using these pixel states, people (including general animals) are detected. By using this method, unlike the method described in Patent Document 1, the target object can be detected even when the person (the target object) is standing stationary or moving slowly.

However, since the method disclosed in Patent Document 2 judges whether or not a person is standing stationary by differences in threshold value, when an object other than a person (for instance an object put down and left behind) stands stationary, it is difficult to detect it. In other words, the method cannot distinguish a stationary object that is not a person from the background.

Further, the method judges continuous background changes based on the assumption that the position and shape of a detected person candidate region do not change, therefore objects whose position and size change, such as the swaying of trees and ripples of water, become an issue.

In Patent Document 3, a method in which a vehicle as an object is detected using the background image is disclosed. However, the method described in Patent Document 3 does not consider the temporal aspects of the image when it judges an object.

[Patent Document 1]
Japanese Patent Kokoku Publication No. JP-B-7-31732 (Page 3, FIG. 1)
[Patent Document 2]
Japanese Patent Kokai Publication No. JP-P2004-258927A (Paragraphs 0036-0039, FIG. 5)
[Patent Document 3]
Japanese Patent Kokai Publication No. JP-P2006-59183A (Paragraphs 0007-0019)

SUMMARY OF THE DISCLOSURE

The following analysis is given by the present invention. The entire disclosures of the above mentioned Patent Documents are herein incorporated by reference thereto.

The conventional object detection methods cannot simultaneously satisfy the detection of an object that both stands stationary and moves around and the non-detection of an unchanged background and a background with changes (for instance a slowly changing background due to shifts in ambient light, and a continuously changing background such as the swaying of trees and ripples of water). This is because they cannot easily distinguish objects with similar variations in pixel characteristics such as a stationary object and an unchanged background, or an object in motion and a changing background.

The present invention aims at providing a object detecting apparatus, a method for detecting an object, and an object detection program capable of detecting a target object that both stands stationary and moves around in a moving picture with background changes and distinguishing the target object from the changing background.

According to a first aspect of the present invention, there is provided an object detecting apparatus comprising pixel state determining unit that determines a pixel state indicative of temporal properties of pixel characteristics of an input image; a background model generating unit that adaptively generates a background model using the pixel state and a characteristic distance indicative of the degree of similarity between pixel characteristics of an input image and a preceding background model as conditions; and object judging unit that judges an object based on a characteristic distance indicative of the degree of similarity between a generated background model and pixel characteristics of an input image.

It is preferable that a pixel state have the temporal properties of pixel characteristics of an input image, and be in one of the following states: a stationary state that is a stable state over a short period of time, a moving state that is an unstable state over a short period of time, a continuously stationary state that is a stable state over a long period of time, and a continuously moving state that is an unstable state over a long period of time.

Pixel state determining unit may determine a pixel state from variance values based on characteristics (from a latest value to a value a short while ago) stored in characteristic storing unit that time-sequentially stores pixel characteristics of an input image and a ratio $R_S$ between the numbers of variance values not more than a threshold value for a stable state in characteristic variance value storing unit that time-sequentially stores the variance values and all stored data. In this case, pixel state determining unit may determine that a pixel state is continuously stationary when a ratio $R_S$ is not less than a threshold for a continuously stationary state, and continuously moving when the ratio $R_S$ is not more than a threshold value for a continuously moving state; and when a pixel state is neither continuously stationary nor continuously moving, pixel state determining unit may determine that a pixel state is stationary when a variance value is not more than a threshold value for a stable state, and moving when the variance value is more than the threshold value for a stable state.

When the pixel state is continuously stationary, background model generating unit may judge that a pixel state is a stationary background, may generate a background model from characteristics stored in characteristic storing unit that time-sequentially stores pixel characteristics of an input image, and copies all characteristics stored in the characteristic storing unit into characteristic storing unit for background model generation; and when the pixel state is continuously moving, background model generating unit may judge that a pixel state is a moving background, generates a background model from characteristics stored in the characteristic storing unit, and may copy all characteristics stored in the characteristic storing unit into the characteristic storing unit for background model generation. Further, when a pixel state is stationary and a characteristic distance indicative of the degree of similarity between pixel characteristics of an input image and a preceding background model is not more than a threshold value, indicating a high degree of similarity, background model generating unit may judge that pixel characteristics of an input image are a background, store latest characteristics stored in the characteristic storing unit into the characteristic storing unit for background model generation, and may generate a background model from characteristics stored in the characteristic storing unit for background model generation; and no background model may be generated and a preceding background model may be utilized when a pixel state does not meet any of the above conditions.

It is preferable that a background model be constituted by a mean of characteristics and a variance of characteristics. A background model may also be constituted by a weighted mean of characteristics and a weighted variance of characteristics, and the weights in the weighted mean and the weighted variance may be set so that the latest value is largest, and the older a value is, the smaller it becomes. Or a background model may be constituted by a plurality of units of characteristics, i.e., a plurality of means, a plurality of variances, and a plurality of weighting coefficients, under assumption of mixture of normal distributions; background models having weighting coefficients not less than a threshold value may be selected from background models; and a smallest characteristic distance among a plurality of characteristic distances derived from characteristics extracted from an input image and a plurality of means and a plurality of variances in the characteristics of the selected background model may be recognized as the final characteristic distance.

Further, characteristics may be constituted by a multi-dimensional vector; a background model may be constituted by multi-dimensional vector of a mean vector and a covariance matrix; and a short-term variance value that indicates whether characteristics are in a stable state or an unstable state may be the trace of covariance matrices of or the maximum value of the diagonal components of covariance matrices of characteristics (from a latest value to a value a short while ago) stored in characteristic storing unit. By having such a structure, the determination of the pixel state, the generation of the background model, and the judgment of an object can be performed utilizing more information.

An object detecting apparatus according to the present invention judges an object by dividing an image and comprises an image dividing unit that divides an input image, temporal characteristic determining unit that determines temporal characteristics of an image per divided an image unit, and image unit specifying unit that analyzes temporal characteristics of a plurality of image units and specifying an image unit in which an object exists. In this case, it is preferable that temporal characteristic determining unit use a pixel as an image unit.

Further, in the object detecting apparatus according to the present invention, temporal characteristic determining unit may derive temporal characteristics from temporal transition information in a state determined by the relationship between the degree of temporal stability of characteristic information obtained per image unit and a continuity degree how long the degree of temporal stability continues.

The object detecting apparatus according to the present invention extracts distinctive features of parts with similarity in temporal properties to each other from a time sequence of characteristic information obtained per image unit and recognizes characteristic information different from the extracted distinctive features as an image unit in which an object exists when temporal characteristics of a plurality of image units are analyzed by image unit specifying unit.

It is preferable that characteristic information include at least one of the following information of an image unit: the intensity, hue, each value of RGB, edge value, optical flow value, and the distance value in a distance image.

According to a preferred mode of the present invention, there is provided an object detecting apparatus that performs processing per image unit, and comprises characteristic storing unit (31 in FIG. 1) for storing extracted characteristics over a long period of time; characteristic variance value storing unit (32 in FIG. 1) for storing short-term variance values of the characteristics over a long period of time; characteristic storing unit for background model generation (33 in FIG. 1) for storing characteristics for background model generation over a long period of time; background model storing unit (34 in FIG. 1) for storing a background model; image capturing unit (1 in FIG. 1) for capturing an image from a moving picture; characteristic extracting unit (21 in FIG. 1) for extracting characteristics of each pixel from the captured image; pixel state determining unit (22 in FIG. 1) for deriving a short-term variance value based on characteristics (from a latest value to a value a short while ago) stored in the characteristic storing unit, storing the variance value in the characteristic variance value storing unit, obtaining a ratio $R_S$ of the number of variance values not more than a threshold value in the characteristic variance value storing unit against all stored data, and determining a pixel state as any one of four states using the derived variance value and the obtained ratio $R_S$; first characteristic distance calculating unit (23 in FIG. 1) for calculating a characteristic distance between the characteristics extracted by the characteristic extracting unit and a preceding background model stored in the background model storing unit; background model generating unit (24 in FIG. 1) for determining a background generation method using the determined pixel state and the calculated characteristic distance as conditions, and generating an adaptive background model from the characteristics in the characteristic storing unit and the characteristic in the characteristic storing unit for background model generation according to the determined method; second characteristic distance calculating unit (25 in FIG. 1) for calculating a characteristic distance between the characteristics extracted in the characteristic extracting unit and the newly generated background model; and object judging unit (26 in FIG. 1) for judging an object using the characteristic distance calculated by the second characteristic distance calculating unit.

By employing such a structure, determining a pixel state indicating temporal properties of characteristics such as stationary (a short-term stability), moving (a short-term instability), continuously stationary (a long-term stability), and continuously moving (a long-term instability) from the short-term variance value, indicating whether characteristics are in a stable state or an unstable state, derived from characteristics stored in the characteristic storing unit, and the ratio $R_S$, indicating how long characteristics have continued to be in a stable state, obtained from the characteristic variance value storing unit; determining a method for generating a background model using this pixel state and the characteristic distance, indicating the degree of similarity between pixel characteristics of an input image and a background model, derived by the first characteristic distance calculating unit as conditions; adaptively generating a background model according to the determined method; and recognizing elements not similar to the background model based on the characteristic distance, indicating the degree of similarity between the pixel characteristics of the input image and the generated background model, derived by the second characteristic distance calculating unit as an object, a first object of the present invention can be achieved.

According to a second aspect of the present invention, there is provided a method for detecting an object comprising: a pixel state determining step that determines a pixel state having temporal properties of pixel characteristics of an input image; a background model generating process that adaptively generates a background model using the pixel state and a characteristic distance that indicates the degree of similarity between pixel characteristics of an input image and a preceding background model as conditions; and an object judging step that judges an object based on a characteristic distance that indicates the degree of similarity between a generated background model and pixel characteristics of an input image.

It is preferable that a pixel state have the temporal properties of pixel characteristics of an input image, and be in one of the following states: a stationary state that is a stable state over a short period of time, a moving state that is an unstable state over a short period of time, a continuously stationary state that is a stable state over a long period of time, and a continuously moving state that is an unstable state over a long period of time. In this case, a pixel state may be determined from variance values based on characteristics (from a latest value to a value a short while ago) stored in characteristic storing unit that time-sequentially stores pixel characteristics of an input image and a ratio $R_S$ between the numbers of variance values not more than a threshold value for a stable state in characteristic variance value storing unit that time-sequentially stores the variance values and all stored data in a pixel state determining step.

Further, in the method for detecting an object according to the second aspect of the present invention, in a pixel state determining step, a pixel state may be determined to be continuously stationary when a ratio $R_S$ is not less than a threshold for a continuously stationary state, and continuously moving when the ratio $R_S$ is not more than a threshold value for a continuously moving state; and when a pixel state is determined to be neither continuously stationary nor continuously moving, a pixel state may be determined to be stationary when a variance value is not more than a threshold value for a stable state, and moving when the variance value is more than the threshold value for a stable state.

Further, in the method for detecting an object according to the second aspect of the present invention, in a background model generating step, a pixel state may be judged to be a stationary background when the pixel state is continuously stationary, a background model may be generated from characteristics stored in characteristic storing unit that time-sequentially stores pixel characteristics of an input image, and all characteristics stored in the characteristic storing unit may be copied into characteristic storing unit for background model generation; a pixel state may be judged to be a moving background when the pixel state is continuously moving, a background model may be generated from characteristics stored in the characteristic storing unit, and all characteristics stored in the characteristic storing unit may be copied into the characteristic storing unit for background model generation; pixel characteristics of an input image may be judged to be a background when a pixel state is stationary and a characteristic distance that indicates the degree of similarity between pixel characteristics of an input image and a preceding background model is not more than a threshold value, indicating a high degree of similarity, latest characteristics stored in the characteristic storing unit may be stored into the characteristic storing unit for background model generation, and a background model may be generated from characteristics stored in the characteristic storing unit for background model generation; and no background model may be generated and a preceding background model may be utilized when a pixel state does not meet any of the above condition.

Further, in the method for detecting an object according to the second aspect of the present invention, it is preferable that a background model be constituted by a mean of characteristics and a variance of characteristics. A background model may also be constituted by a weighted mean of characteristics and a weighted variance of characteristics, and the weights in the weighted mean and the weighted variance may be set so that the latest value is largest, and the older a value is, the smaller it becomes. Or a background model may be constituted by a plurality of units of characteristics, i.e., a plurality of means, a plurality of variances, and a plurality of weighting coefficients under assumption of mixture of normal distributions; a background model having weighting coefficients not less than a threshold value may be selected from background models; and a smallest characteristic distance among a plurality of characteristic distances derived from characteristics extracted from an input image and a plurality of characteristic distance obtained from a plurality of means and variances of the selected background model may be recognized as a final characteristic distance.

Further, in the method for detecting an object according to the second aspect of the present invention, characteristics may be constituted by multi-dimensional vector; a background model may be constituted as multi-dimensional vector by a mean vector and a covariance matrix; and a short-term variance value that indicates whether characteristics are in a stable state or an unstable state may be a sum of diagonal components of covariance matrices of or a maximum value of the diagonal components of covariance matrices of characteristics (from a latest value to a value a short while ago) stored in characteristic storing unit.

Further, a method for detecting an object according to another mode of the present invention, in which an object is judged by dividing an image, comprises an image dividing step that divides an input image; a temporal characteristic determining process that determines temporal characteristics of an image per divided image unit; and an image unit specifying step that analyzes temporal characteristics of a plurality of image units and that specifies image units in which an object exists. In this case, the image unit may be a pixel. Further, in a temporal characteristic determining step, temporal characteristics may be derived from temporal transition information in a state determined by the relationship between the degree of temporal stability of characteristic information obtained per image unit and a continuity degree how long the degree of temporal stability continues.

Further, when temporal characteristics of a plurality of image units are analyzed in the image unit specifying step, distinctive features of parts with similarity in temporal properties to each other may be extracted from the time sequence of characteristic information obtained per image unit, and characteristic information different from the extracted distinctive features may be recognized as an image unit in which an object exists.

In a preferred mode of the method for determining a pixel state, a pixel state is determined to be continuously stationary when the ratio $R_S$ is not less than a threshold for a continuously stationary state, and continuously moving when the ratio $R_S$ is not more than a threshold value for a continuously moving state; and when a pixel state is neither continuously stationary nor continuously moving, a pixel state is determined to be stationary when a variance value is not more than a threshold value for a stable state, and moving when the variance value is more than the threshold value for a stable state. In a preferred mode of the method for generating a background model, a pixel is determined to be a stationary background when the pixel state is continuously stationary, and a background model is generated from characteristics stored in characteristic storing unit; a pixel is determined to be a moving background when the pixel state is continuously moving, and a background model is generated from characteristics stored in the characteristic storing unit; pixel characteristics of an input image are determined to be a background model when a pixel state is stationary and the degree of similarity between pixel characteristics of an input image and a background model is high, the latest characteristics are stored into the characteristic storing unit for background model generation, and a background model is generated therefrom; and in all the other cases, no background model is generated and the preceding background model is utilized.

According to a third aspect of the present invention, there is provided an object detection program that has a computer execute a pixel state determining processing that determines a pixel state having temporal properties of pixel characteristics of an input image; a background model generating processing that adaptively generates a background model using the pixel state and a characteristic distance that indicates the degree of similarity between pixel characteristics of an input image and a preceding background model as conditions; and an object judging processing that judges an object based on a characteristic distance that indicates the degree of similarity between a generated background model and pixel characteristics of an input image.

Further, a computer may be used to execute a pixel state determining processing wherein a pixel state is determined from variance values based on characteristics (from a latest value to a value a short while ago) stored in characteristic storing unit that time-sequentially stores pixel characteristics of an input image and a ratio $R_S$ between the numbers of variance values not more than a threshold value for a stable state in characteristic variance value storing unit that time-sequentially stores the variance values and all stored data. In this case, it is preferable that a computer be used to execute a pixel state determining processing wherein a pixel state is determined to be continuously stationary when a ratio $R_S$ is not less than a threshold for a continuously stationary state, and continuously moving when the ratio $R_S$ is not more than a threshold value for a continuously moving state; and when a pixel state is determined to be neither continuously stationary nor continuously moving, a pixel state is determined to be stationary when a variance value is not more than a threshold value for a stable state, and moving when the variance value is more than the threshold value for a stable state.

The object detection program according to the third aspect of the present invention may have a computer execute a background model generating processing wherein, when a pixel state is continuously stationary, a background model is generated from characteristics stored in characteristic storing unit that time-sequentially stores pixel characteristics of an input image, and all characteristics stored in the characteristic storing unit are copied into characteristic storing unit for background model generation; when a pixel state is continuously moving, a background model is generated from characteristics stored in the characteristic storing unit, and all characteristics stored in the characteristic storing unit are copied into the characteristic storing unit for background model generation; when a pixel state is stationary and a characteristic distance that indicates the degree of similarity between pixel characteristics of an input image and a preceding background model is not more than a threshold value, indicating a high degree of similarity, latest characteristics stored in the characteristic storing unit are stored into the characteristic storing unit for background model generation, and a background model is generated from characteristics stored in the characteristic storing unit for background model generation; and no background model is generated and a preceding background model is utilized when a pixel state does not meet any of the above condition.

Further, an object detection program according to another mode of the third aspect of the present invention has a computer that judges an object by dividing an image execute an image dividing processing that divides an input image; a temporal characteristic determining processing that determines temporal characteristics of an image per divided image unit; and an image unit specifying processing that analyzes temporal characteristics of a plurality of image units and that specifies an image unit in which an object exists.

Further, the object detection program according to the third aspect of the present invention may have a computer execute a temporal characteristic determining processing wherein temporal characteristics are derived from temporal transition information in a state determined by the relationship between the degree of temporal stability of characteristic information obtained per image unit and a continuity degree how long the degree of temporal stability continues.

Further, the object detection program according to the present invention may have a computer execute an image unit specifying processing wherein, when temporal characteristics of a plurality of image units are analyzed, distinctive features of parts with similarity in temporal properties to each other are extracted from the time sequence of characteristic information obtained per image unit; and characteristic information different from the extracted distinctive features is recognized as an image unit in which an object exists.

The meritorious effects of the present invention are summarized as follows.

A first effect of the present invention is that a stationary or moving target object can be detected from a slowly moving background (for instance ambient light), a continuously changing (or moving) background (for instance the swaying of trees and ripples of water), and a normal stationary background in a moving picture with the changing background. The reason is that a method for generating a background model is determined using a pixel state that indicates the temporal properties of characteristics determined from the time-sequential characteristics of an input image and the degree of similarity between the pixel characteristics of the input image and a preceding background model as conditions, a background model is adaptively generated according to the determined method, and an object is judged based on the degree of similarity between the generated background model and the pixel characteristics of the input image. A stationary target object is detected as an object since its pixel state is not instantly determined to be continuously stationary and a stationary background model is not generated.

Further, a slowly changing (or moving) background (for instance ambient light) is not detected as an object because, when its pixel state is stationary and the degree of similarity between the pixel characteristics of the input image and the background model is high, the elements of background model generation are updated with the pixel characteristics of the input image and a background model is generated from the latest elements. Further, a continuously changing background (for instance the swaying of tree or ripples of water) is not detected as an object since its pixel state is determined to be continuously moving (or turbulent) and a charging (or turbulent) background model is generated.

An object passing by in front of a continuously changing background is accurately detected as an object because the properties of its characteristics are different from those of a charging (or turbulent) background model.

A second effect of the present invention is that the time during which a stationary object is continued to be detected can be set as desired upon needs. A stationary object is not detected as an object anymore once its pixel state is determined to be continuously stationary and it is incorporated into a background model. The time for a pixel state to be judged to be continuously stationary is determined by the threshold value of the continuously stationary state for a ratio $R_S$ between the numbers of variance values not more than a predetermined threshold value in characteristic variance value storing unit and all stored data, and the number of all the stored data in the characteristic variance value storing unit. Therefore, the time during which a stationary object is continued to be detected is settable.

A third effect of the present invention is that an object can be detected without preparing an accurate background image that does not include the target object. The reason is that a background model is adaptively generated from the stored characteristics using the pixel state indicating the temporal properties of the characteristics determined from the time-sequential characteristics of the input image and the degree of similarity between the pixel characteristics of the input image and the preceding background model as conditions.

PREFERRED MODES OF THE INVENTION

Example 1

Figure 1:
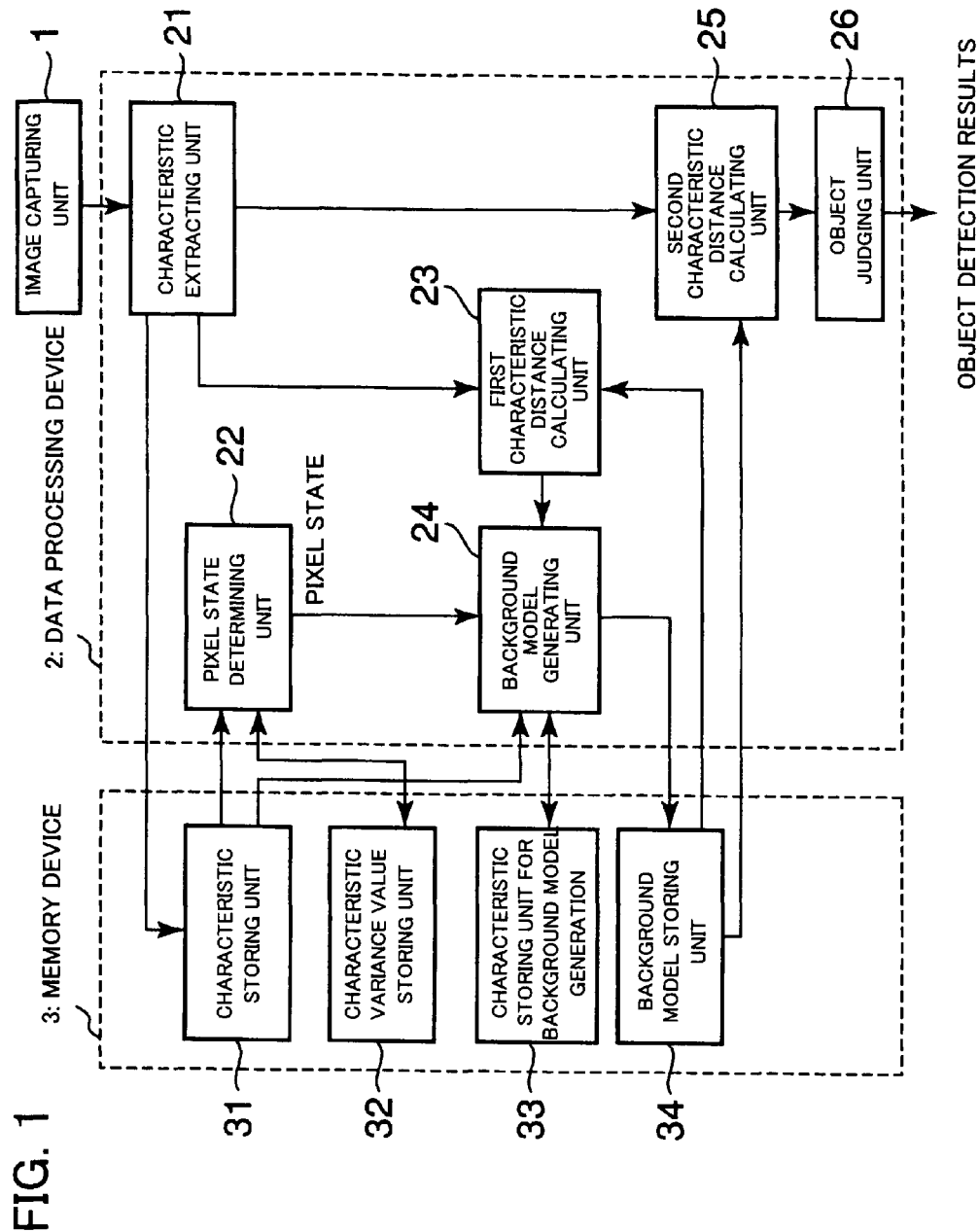
FIG. 1 is a block diagram showing the configuration of first, second, third, and fourth examples of the present invention.

Examples of the present invention will be described in detail with reference to the drawings. FIG. 1 is a block diagram showing an example of an object detecting apparatus according to the present invention. The object detecting apparatus shown in FIG. 1 comprises image capturing unit 1 for capturing an image from a moving picture of a camera and a video camera, a data processing-device 2 controlled by a program, and a memory device 3 that stores information. Further the memory device 3 includes characteristic storing unit 31, characteristic variance value storing unit 32, characteristic storing unit 33 for background model generation, and background model storing unit 34.

The characteristic storing unit 31 stores $n_{LW}$ number of characteristics in a FIFO (First In First Out) buffer over a long period of time. The FIFO buffer is provided for each pixel. The characteristic variance value storing unit 32 stores $n_{LW}$ number of short-period variance values of the characteristics in the FIFO buffer over a long period. The characteristic storing unit 33 for background model generation stores $n_{LW}$ number of characteristics for background model generation in the FIFO buffer over a long period. The background model storing unit 34 stores the mean value $\mu_{BG}$ for $n_{LW}$ number of long-period characteristics, which are elements used to generate a background model, and a variance value $\sigma^2_{BG}$ as a background model. A memory that stores the background model in the background model storing unit 34 is provided for each pixel.

In the present example, a "short-period" variance value is utilized in order to determine whether or not captured characteristics are reliable values, i.e., whether or not these values are stable. This variance value is calculated from characteristics over a "short period"of time between a time when the characteristics are captured and a (precedent) time in the past. When the calculated variance value is not more than a predetermined threshold value, it is determined that the characteristics are reliable, i.e., these are stable values. "Short period" is the time needed to make these judgments. For instance, when the characteristic is the intensity, the "short period" of time is set to approximately 1 second. "Approximately 1 second" unit "frames corresponding to approximately 1 second" to be precise, and the exact frame number depends on the frame rate.

Further, in the present example, when characteristics in a stable state continue for a "long period" of time, the characteristics are assumed to be (a part of) a background. Therefore, a background model is generated from the "long-period" characteristics. In other words, the "long period" of time is the time required to render an object (a part of) a background when the object continues to be in a stable state for certain length of period. For instance, a vehicle parked in a parking lot is detected as an object at first. However, after a long period of time has lapsed, the parked vehicle is treated as a background since a background model is generated utilizing long-period characteristics of the object pixels. As a result, it is no longer detected as an object.

The lapse of the long period of time unit that the ratio of the period during which an object is in a stable state against the long period of time, i.e., the continuity level of the stable state, is equal to or more than a predetermined threshold value, as described using an example. For instance, when an object that stands stationary for 60 seconds should not be detected as an object, the "long period" of time is set to 60 seconds, and the threshold value for the ratio of the period during which an object is in a stable state is set to 100 percent.

As shown in FIG. 1, the data processing device 2 comprises characteristic extracting unit 21, pixel state determining unit 22, first characteristic distance calculating unit 23, background model generating unit 24, second characteristic distance calculating unit 25, and object judging unit 26.

The characteristic extracting unit 21 extracts characteristics I of each pixel from an image captured by the image capturing unit 1. The characteristics I include the intensity, hue, each value of RGB, edge value, optical flow value, and the distance value in a distance image. Basically, the characteristics I should be characteristics that are stable over time when an object stands stationary and that are unstable over time when the object is in motion.

In order to determine whether the characteristics I are in a stable state or an unstable state, the pixel state determining unit 22 derives a variance value $\sigma^2_{SW}$ for a last (or past by a short period of time) $n_{SW}$ number ($n_{SW}$<$n_{LW}$) of the characteristics I starting from the latest value stored in the characteristic storing unit 31 over a short period of time. The derived variance value $\sigma^2_{SW}$ is stored in the characteristic variance value storing unit 32. Further, the pixel state determining unit 22 obtains a ratio $R_S$ (the continuity level of a stable state) according to a formula (1) in order to determine how long the characteristics I have continued to be in the stable state.

[Formula 1]

$$R_S(x, y, t) = \frac{\text{number of the variance values } \sigma^2_{SW} \leq \sigma^2_{TH} \text{ in the characteristic variance value storing unit}}{n_{LW}} \quad (1)$$

In the formula (1), x and y indicate the pixel position, and t indicates time. The ratio $R_S$ is the ratio of the variance value $\sigma^2_{SW}$ not more than a threshold value $\sigma^2_{TH}$ in the characteristic variance value storing unit 32 versus all the data stored. Using the derived variance value $\sigma^2_{SW}$ and the obtained ratio $R_S$, the pixel state determining unit 22 determines which of the four states the pixel state is in according to a pixel state transition diagram such as one shown in FIG. 2: "stationary" (S), "transient or moving" (T), "continuously stationary" (CS), and "continuously transient or moving" (CT). Further, the pixel state indicates the state of the characteristics I over time (the temporal characteristics). "Stationary" indicates being stable for a short period of time, "transient" unstable for a short period of time, "continuously stationary" stable for a long period of time, and "continuously transient" unstable for a long period of time. Note the (T) may be set as turbulent, upon needs.

Figure 2:
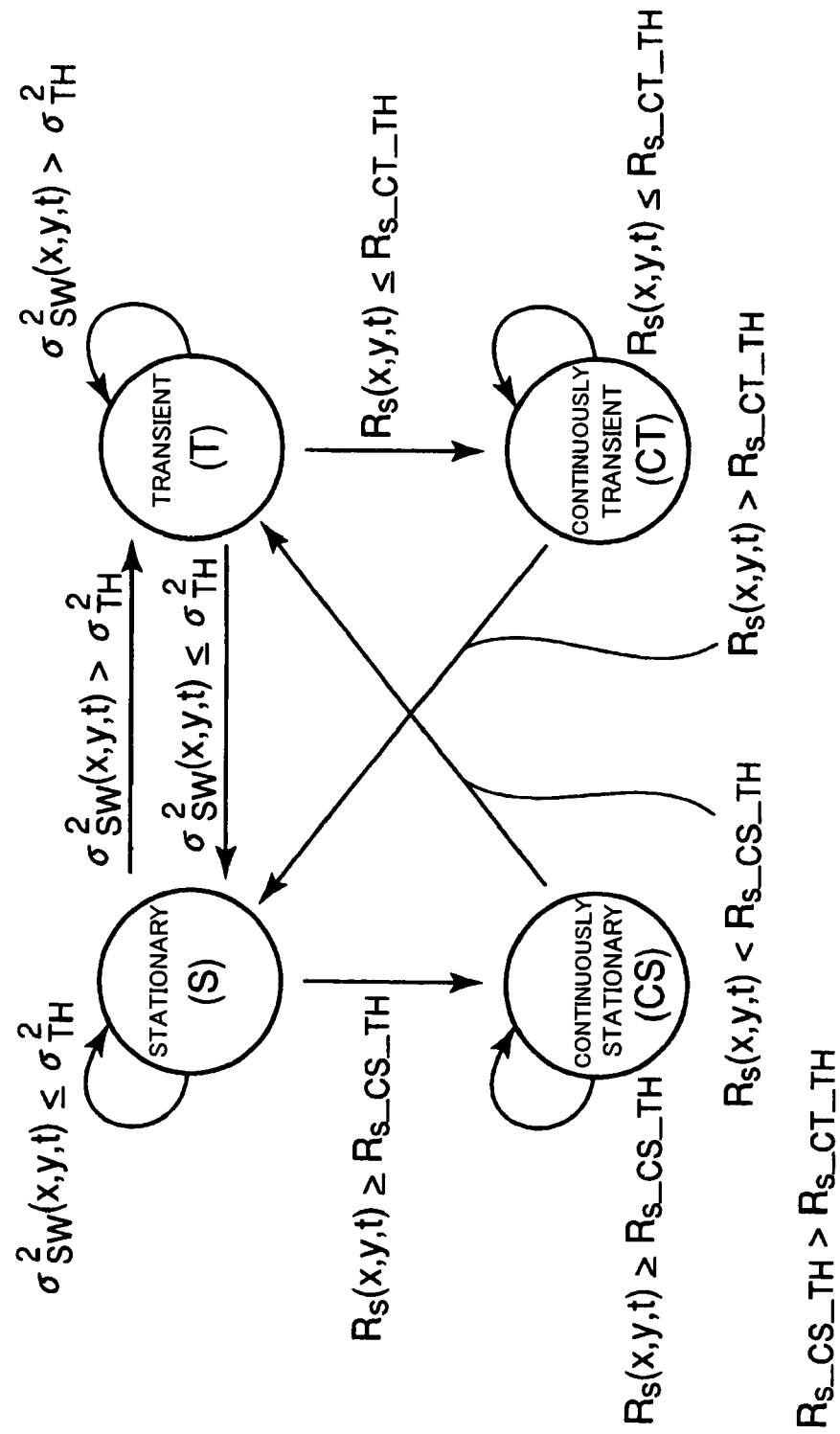
FIG. 2 is a drawing explaining the pixel state transition in the first, second, third, and fourth examples of the present invention.
Figure 3:
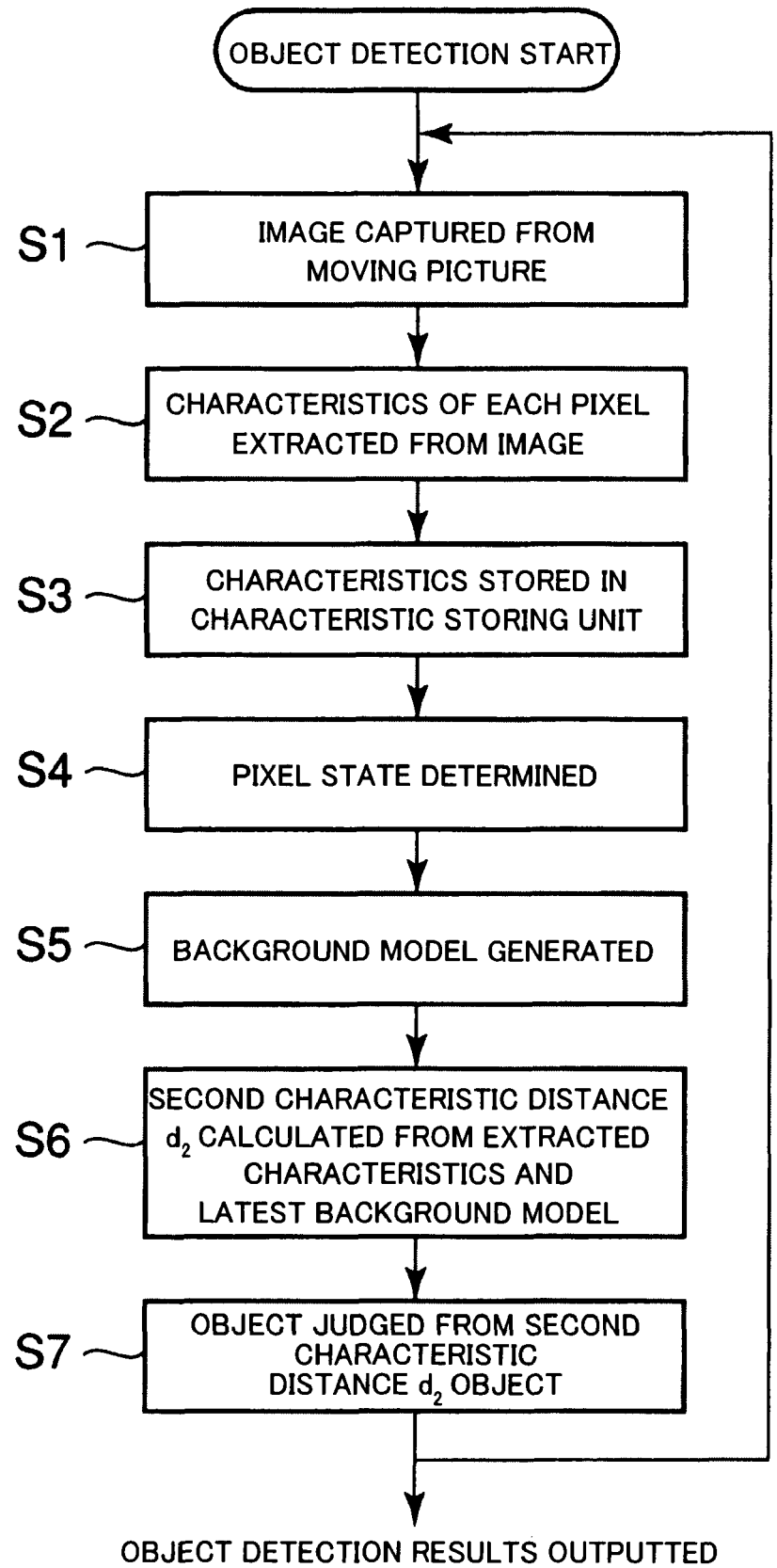
FIG. 3 is a flowchart showing the operation of the first and second examples.

In the pixel state transition diagram shown in FIG. 2, the pixel state changes according to the following rule: when the ratio $R_S$ obtained is not less than a threshold value $R_{S\_CS\_TH}$ for the "continuously stationary" state, the pixel state is "continuously stationary." When it is not more than a threshold value $R_{S\_CT\_TH}$ for the "continuously transient" state, the pixel state is "continuously transient." Further, when the ratio $R_S$ does not correspond to either condition above and the variance value $\sigma^2_{SW}$ is not more than the threshold value $\sigma^2_{TH}$, the pixel state is "stationary." It is "transient"in all the other cases.

Further, the threshold value $R_{S\_CS\_TH}$ for the "continuously stationary" state and the threshold value $R_{S\_CT\_TH}$ for the "continuously transient" state should satisfy the following relationship: $R_{S\_CS\_TH}$>$R_{S\_CT\_TH}$. Basically, the threshold value $R_{S\_CS\_TH}$ for the "continuously stationary" state is 1.

Here, the ratio $R_S$ is derived by storing the variance values $\sigma^2_{SW}$ in the characteristic variance value storing unit 32, and however, it is also possible to obtain the ratio $R_S$ by storing the results of judging the variance values $\sigma^2_{SW}$ indicating stable or unstable state (the judging results of whether or not the variance value $\sigma^2_{SW}$ is equal to or less than the threshold value $\sigma^2_{TH}$) in the characteristic variance value storing unit 32, and deriving the ratio of the stable states against (relative to) all the stored data.

The first characteristic distance calculating unit 23 calculates a characteristic distance $d_1$ between the characteristics I extracted by the characteristic extracting unit 21 and a preceding background model (i.e., the mean value $\mu_{BG}$ and the variance value $\sigma^2_{BG}$) stored in the background model storing unit 34 according to a formula (2). Note that the preceding background model is a background model stored in the background model storing unit 34, and this background model has been already generated by the background model generating step of the background model generating unit 24.

[Formula 2]

$$d_1(x, y, t) = \sqrt{\frac{(I(x, y, t) - \mu_{BG}(x, y, t-1))^2}{\sigma^2_{BG}(x, y, t-1)}} \quad (2)$$

The calculated characteristic distance $d_1$ is standardized (or normalized), and the smaller the characteristic distance $d_1$ is, the more similar these characteristics become.

The background model generating unit 24 determines a method for generating the background model using the pixel state determined by the pixel state determining unit 22 and the characteristic distance di calculated by the first characteristic distance calculating unit 23 as conditions. According to this method, an adaptive background model is generated from characteristics I in the characteristic storing unit 31 and characteristics I in the characteristic storing unit 33 for background model generation.

For instance, when the pixel state is "continuously stationary," the background model generating unit 24 determines that the pixel is a stationary background for a long period of time in the past since the characteristics I is stable for a long period of time. The mean value $\mu_{BG}$ and the variance value $\sigma^2_{BG}$ of the characteristics I in the character storing unit 31 are calculated as a background model. After the calculation, all the characteristics I in the character storing unit 31 are copied into the characteristic storing unit 33 for background model generation.

Further, when the pixel state is "continuously transient," the background model generating unit 24 determines the pixel is a continuously moving background including a long period of past since the characteristics I is unstable for a long period of time. The mean value $\mu_{BG}$ and the variance value $\sigma^2_{BG}$ of the characteristics I in the character storing unit 31 are calculated as a background model. After the calculation, all the characteristics I in the character storing unit 31 are copied into the characteristic storing unit 33 for background model generation.

When the pixel state is "stationary" and the characteristic distance d1 calculated by the first characteristic distance calculating unit 23 is not more than a characteristic distance threshold value $d_{TH}$, therefore indicating a high degree of similarity, the background model generating unit 24 determines that the characteristics I extracted by the characteristic extracting unit 21 are a background since the characteristics I are reliable values and similar to the background model. Then, the characteristics I extracted by the characteristic extracting unit 21, i.e., the latest characteristics I in the characteristic storing unit 31, are stored in the characteristic storing unit 33 for background model generation. In other words, the background model elements are updated. Then, the mean value $\mu_{BG}$ and the variance value $\sigma^2_{BG}$ of the characteristics I in the characteristic storing unit 33 for background model generation are calculated as a background model.

When the determined pixel state and the characteristic distance $d_1$ do not correspond to the above conditions, the background model generating unit 24 does not generate any background model. In this case, a preceding background model is used.

The second characteristic distance calculating unit 25 calculates a characteristic distance $d_2$ between the characteristics I extracted by the characteristic extracting unit 21 and the latest background model (i.e., a mean value $\mu_{BG}$ and the variance value $\sigma^2_{BG}$) stored in the background model storing unit 34 according to a formula (3).

[Formula 3]

$$d_2(x, y, t) = \sqrt{\frac{(I(x, y, t) - \mu_{BG}(x, y, t))^2}{\sigma^2_{BG}(x, y, t)}} \quad (3)$$

The calculated characteristic distance $d_2$ is standardized (or normalized), and the smaller the characteristic distance $d_2$ is, the more similar these characteristics become.

The object judging unit 26 generates a gray image Y where the characteristic distance $d_2$ calculated by the second characteristic distance calculating unit 25 is normalized to values between 0 and 255 according to a formula (4).

[Formula 4]

$$Y(x, y, t) = \frac{255}{1 + \exp(-a d_2(x, y, t) + b)} \quad (4)$$

Note that a and b are positive constants. The object judging unit 26 judges an object by binary processing using image processing such as binarization using a threshold value and binarization using the discriminant analysis method (a lowest threshold value is set). By generating the gray image Y, the image processing becomes easier, and additional image processing such as noise removal can be performed. Other various binarization methods such a method in which an object is recognized by directly setting a threshold value for the characteristic distance $d_2$ can be applied.

Next, the operation of the object detecting apparatus of the present example will be described with reference to FIGS. 1, 3, 4 and 5. The image capturing unit 1 captures an image from a moving picture of a camera and a video camera (step S1). The characteristic extracting unit 21 extracts characteristics I of each pixel from the captured image (step S2). Further, the extracted characteristics I are stored in the characteristic storing unit 31 (step S3). The pixel state determining unit 22 determines the pixel state (step S4). In the present example, since the characteristic extracting unit 21 extracts the characteristics I of each pixel, the input image is essentially divided, pixel by pixel. However, the unit (pixel unit) that divides the image does not have to be a pixel, but it may be a multiple pixel unit, for instance.

Figure 4:
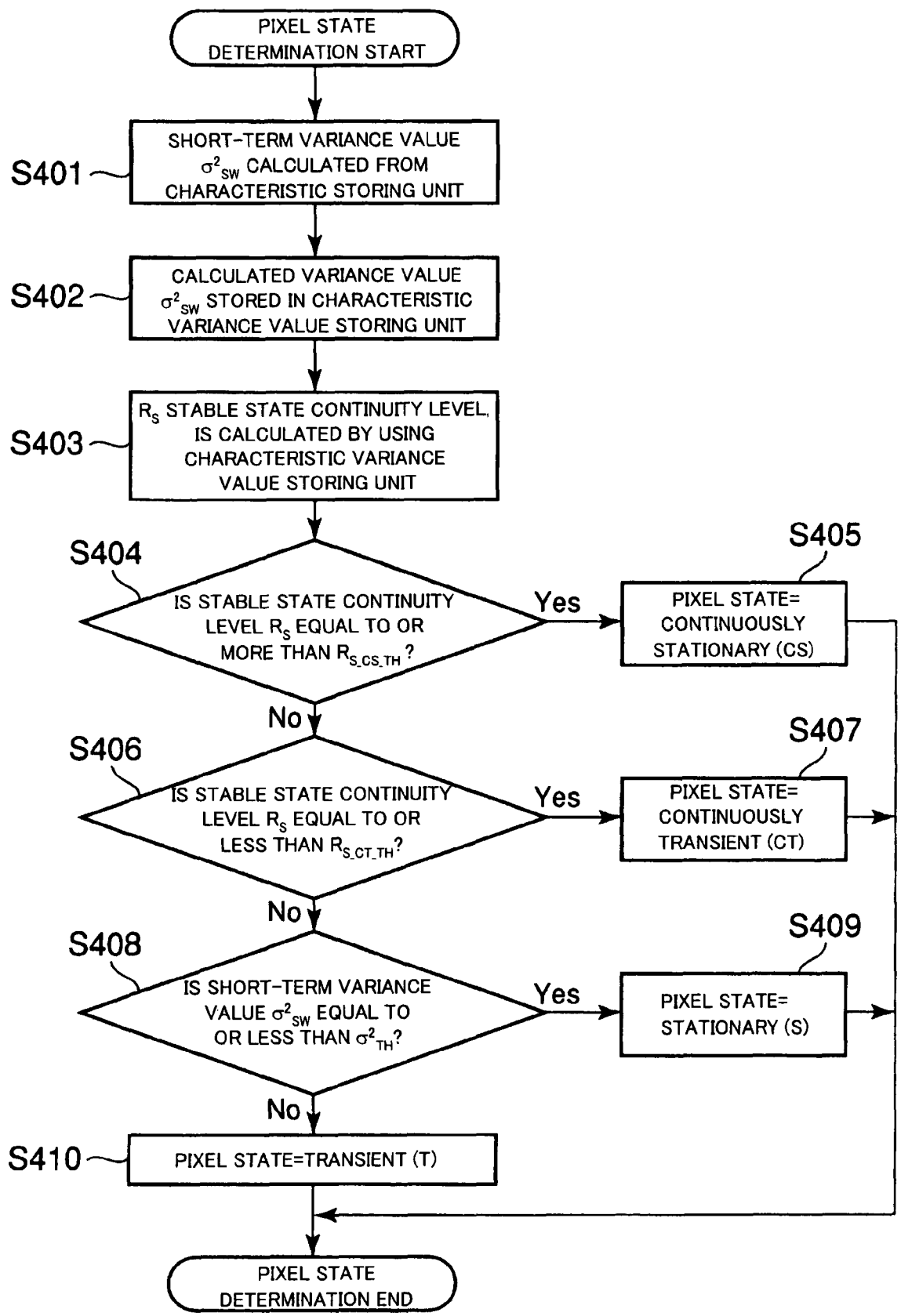
FIG. 4 a flowchart showing the operation of the first, second, and third examples.
Figure 5:
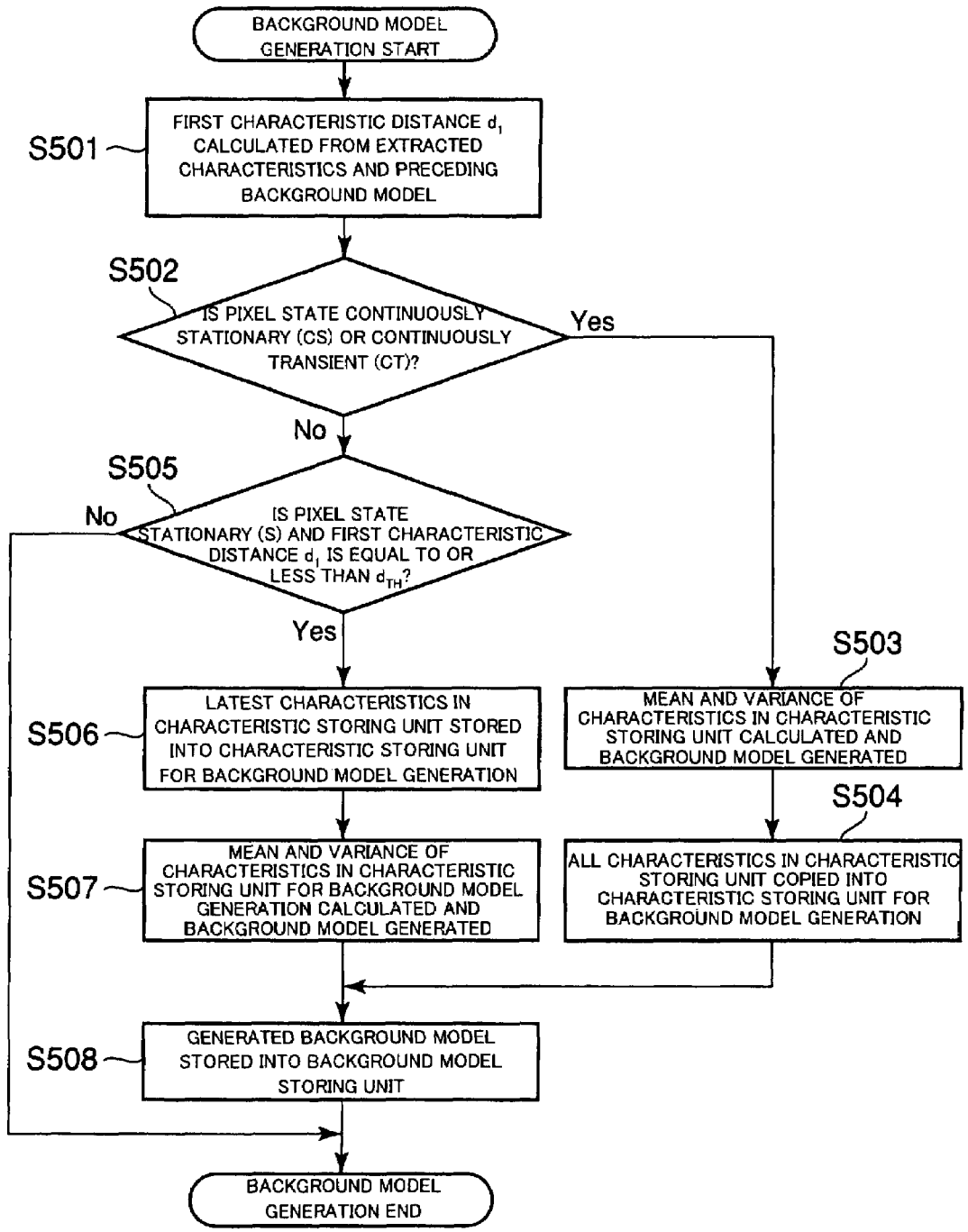
FIG. 5 is a flowchart showing the operation of the first example.

The processing of the step S4 will be described in detail with reference to FIG. 4. The pixel state determining unit 22 calculates the variance value $\sigma^2_{SW}$ for the last $n_{SW}$ number of the characteristics I starting from the latest value stored in the characteristic storing unit 31 over a short period of time (step S401). Then, the calculated variance value $\sigma^2_{SW}$ is stored in the characteristic variance value storing unit 32 (step S402). Further, according to the formula (1), the ratio $R_S$, the ratio between the numbers of the variance values $\sigma^2_{SW}$ not more than the threshold value $\sigma^2_{TH}$ in the characteristic variance value storing unit 32 and all the data stored, i.e., the continuity level of a stable state, is calculated (step S403). And the pixel state determining unit 22 determines whether or not the ratio $R_S$ is equal to or more than the threshold value $R_{S\_CS\_TH}$ for the "continuously stationary" state (step S404). When it is not less than the threshold value $R_{S\_CS\_TH}$, the pixel state is determined to be "continuously sill" (step S405). When it is less than the threshold value $R_{S\_CS\_TH}$, whether or not the ratio $R_S$ is equal to or less than the threshold value $R_{S\_CT\_TH}$ for the "continuously transient (or moving)" state is determined (step S406).

When it is not more than the threshold value $R_{S\_CT\_TH}$, the pixel state is determined to be "continuously transient (or moving)" (step S407). When it is more than the threshold value $R_{S\_CT\_TH}$, whether or not the variance value $\sigma^2_{SW}$ is equal to or less than the threshold value $\sigma^2_{TH}$ is determined (step S408). When it not more than the threshold value $\sigma^2_{TH}$, the pixel state is determined to be "stationary"(step S409). Further, when it is more than the threshold value $\sigma^{2TH}$, the pixel state is determined to be "transient (or moving)" (step S410).

After the pixel state has been determined in the step S4, the background model generating unit 24 generates a background model (step S5). The processing of the step S5 will be described in detail with reference to FIG. 5. The first characteristic distance calculating unit 23 calculates the first characteristic distance $d_1$ using the characteristics I extracted by the characteristic extracting unit 21 and a preceding background model (i.e., the mean value $\mu_{BG}$ and the variance value $\sigma^2_{BG}$) stored in the background model storing unit 34 according to the formula (2) (step S501). Then, the background model generating unit 24 judges whether the pixel state determined by the pixel state determining unit 22 is "continuously stationary" or "continuously transient" (step S502).

When the pixel state is either "continuously stationary" or "continuously transient," the background model generating unit 24 calculates a mean value $\mu_{BG}$ and a variance value $\sigma^2_{BG}$ of the characteristics I stored in the characteristic storing unit 31 as a background model (step S503). Further, all the characteristics I in the characteristic storing unit 31 are copied into the characteristic storing unit 33 for background model generation (step S504).

When the pixel state is neither "continuously stationary" nor "continuously transient," the background model generating unit 24 determines whether or not the pixel state is "stationary" and whether or not the first characteristic distance $d_1$ is equal to or less than the characteristic distance threshold $d_{TH}$ (step S505). When the pixel state is "stationary" and the first characteristic distance $d_1$ is not more than the characteristic distance threshold $d_{TH}$, the latest characteristics I in the characteristic storing unit 31 are stored in the characteristic storing unit 33 for background model generation (step S506). Mean value $\mu_{BG}$ and variance value $\sigma^2_{BG}$ of the characteristics I stored in the characteristic storing unit 33 for background model generation are calculated as a background model (step S507). When the pixel state is not "stationary" or the first characteristic distance $d_1$ is more than the characteristic distance threshold $d_{TH}$, the background model generating unit 24 does not generate any background model.

Finally, the background model generated in the step S504 or S507 is stored in the background model storing unit 34 (step S508). When no background model is generated here, nothing new is stored in the background model storing unit 34, and the preceding background model remains. In other words, the fact that no background model is generated means that the preceding background model is generated.

After the background model has been generated in the processing of the step S5, the second characteristic distance calculating unit 25 calculates the second characteristic distance $d_2$ according to the formula (3) (step S6). In this calculation, the characteristics I extracted by the characteristic extracting unit 21 and the latest background model (i.e., the mean value $\mu_{BG}$ and the variance value $\sigma^2_{BG}$) stored in the background model storing unit 34 are used.

The object judging unit 26 generates the gray image Y where the second characteristic distance $d_2$ is normalized to values between 0 and 255 according to the formula (4), and judges an object by binary processing using image processing such as binarization using a threshold value and binarization using the discriminant analysis method (a lowest threshold value is set) (step S7). Then the object detection result is outputted.

Next, the effects of the present example will be explained. In the present example, the method for generating the background model is determined using the pixel state indicating the temporal properties of the characteristics determined from the time-sequential characteristics of the input image, and the degree of the similarity between the pixel characteristics of the input image and the background model as conditions. According to this method, the background model is adaptively generated, and since an object is recognized based on the similarity between the generated background model and the pixel characteristics of the input image, a stationary or moving target object can be detected from a slowly changing background (for instance shifting ambient light), continuously changing background (for instance the swaying of trees and ripples of water), and a normal stationary background in a moving picture with a changing background.

Further, in the object detecting apparatus of the present example, a stationary target object is incorporated into the background model when its pixel state is determined to be "continuously stationary," and it is not detected as an object. The amount of time required for the pixel state to be "continuously stationary" is determined by the threshold value $R_{S\_CS\_TH}$ for the "continuously stationary" state, and the number of all the stored data in the characteristic variance value storing unit 32. Therefore, the period during which a stationary target object is continued to be detected can be set as desired.

For instance, the amount of time required for the pixel state to be "continuously stationary" can be made shorter by decreasing the threshold value for the "continuously stationary" state. In other words, the pixel state is more likely to be determined to be "continuously stationary."

Further, since the background model is adaptively generated from the stored characteristics using the pixel state indicating the temporal properties of the characteristics determined from the time-sequential characteristics of the input image over time, and the degree of the similarity between the pixel characteristics of the input image and the preceding background model as conditions, an object can be detected without preparing an accurate background image that dose not include the target object.

Example 2

Next, a second example of the present invention will be described with reference to the drawings. An object detecting apparatus of the second example is basically configured identically to the object detecting apparatus of the first example shown in FIG. 1, however, the function of the background model generating unit 24 is partially modified. The background model generating unit 24 performs the function of the background model generating unit 24 in the first example shown in FIG. 1, but it calculates weighted mean value of the characteristics I as the mean value $\mu_{BG}$ and a weighted variance value of the characteristics I as the variance value $\sigma^2_{BG}$, instead of calculating the mean value $\mu_{BG}$ and the variance value $\sigma^2_{BG}$ of the characteristics I as the background model. The background model generating unit 24 calculates the weighted mean value according to formula (5).

[Formula 5]

$$\mu_{BG}(x, y, t) = \frac{\sum_{i=1}^{n_{LW}} W_i I_i(x, y)}{\sum_{i=1}^{n_{LW}} W_i} \quad (5)$$

$W_i$ is the weighting coefficient, and $I_i$ is the characteristics. Then, the weighted variance value is calculated according to formula (6).

[Formula 6]

$$\sigma^2_{BG}(x, y, t) = \frac{\sum_{i=1}^{n_{LW}} W_i (I_i(x, y) - \mu_{BG}(x, y, t))^2}{\sum_{i=1}^{n_{LW}} W_i} \quad (6)$$

$W_i$ is the weighting coefficient, and $I_i$ is the characteristics. The newer (i.e., the closer to the present) the characteristics I are, the more reliable they become as the background, therefore the weighting coefficient $W_i$ is set so that the older values are, the smaller they become.

Figure 6:
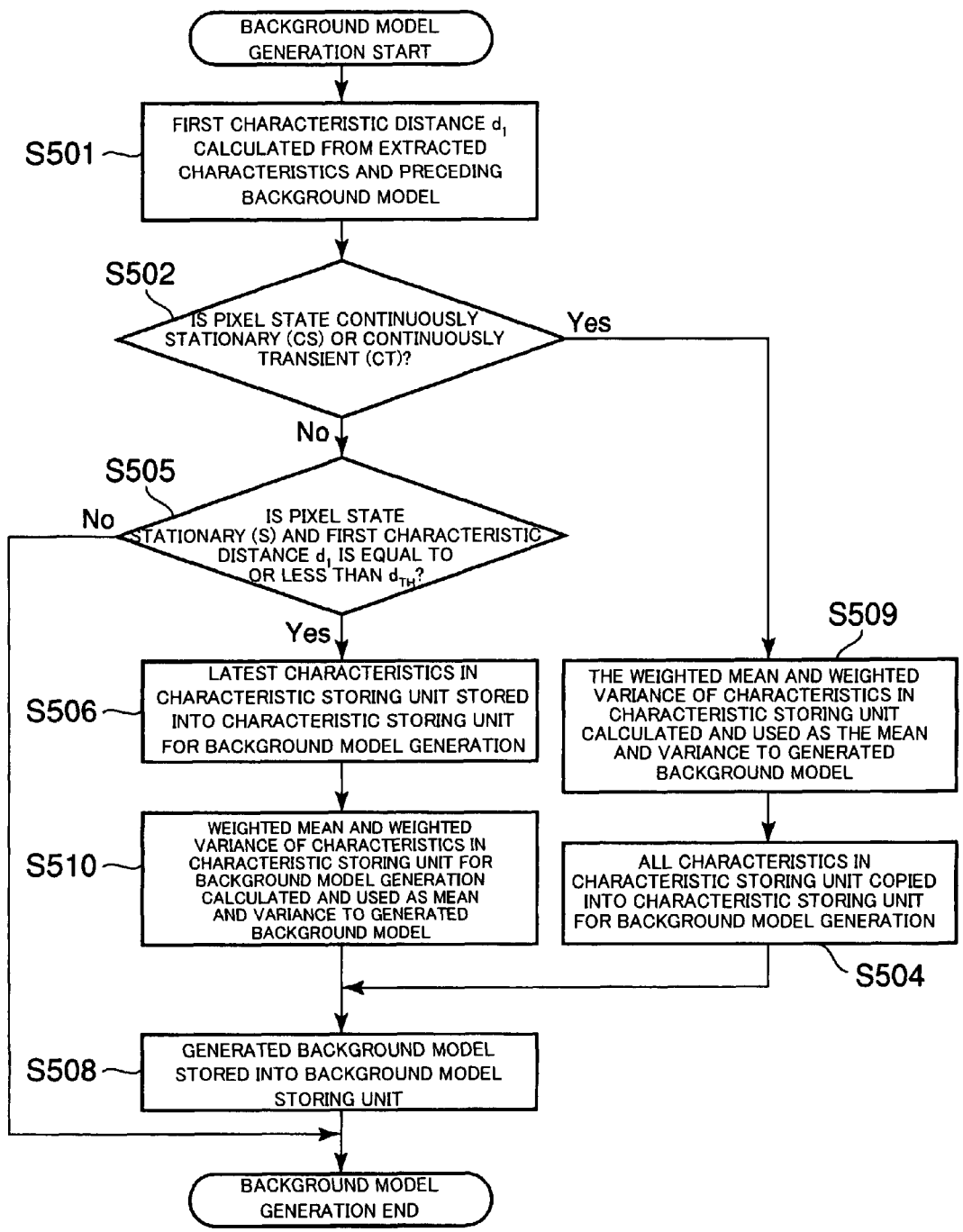
FIG. 6 is a flowchart showing the operation of the second example.

Next, the operation of the object detecting apparatus of the second example will be described with reference to FIGS. 1, 3, 4, and 6. The operation of the present example differs from the first example in that the steps S503 and S507 are removed from the operation of the first example shown in FIG. 5, and steps S509 and S510 are added as shown in FIG. 6. The other steps are identical to the corresponding steps in the first example.

The background model generating unit 24 judges whether the pixel state determined by the pixel state determining unit 22 is "continuously stationary" or "continuously transient" (step S502.) When it is either "continuously stationary" or "continuously transient," the weighted mean value and weighted variance value of the characteristics I stored in the characteristic storing unit 31 are calculated according to the formulas (5) and (6), and the weighted mean value and weighted variance value are respectively recognized as the mean value $\mu_{BG}$ and the variance value $\sigma^2_{BG}$, i.e., the background model (step S509) respectively. Further, all the characteristics I in the characteristic storing unit 31 are copied into the characteristic storing unit 33 for background model generation (step S504). When the pixel state is neither "continuously stationary" nor "continuously transient," whether or not the pixel state is "stationary" and whether or not the first characteristic distance $d_1$ is equal to or less than the characteristic distance threshold $d_{TH}$ are determined (step S505). When the pixel state is "stationary" and the first characteristic distance $d_1$ is not more than the characteristic distance threshold $d_{TH}$, the latest characteristics I in the characteristic storing unit 31 are stored in the characteristic storing unit 33 for background model generation (step S506), and the weighted mean value and the weighted variance value of the characteristics I in the characteristic storing unit 33 for background generation are calculated according to the formulas (5) and (6). The weighted mean value and the weighted variance value are recognized as the mean value $\mu_{BG}$ and the variance value $\sigma^2_{BG}$, i.e., the background model (step S510), respectively. When the pixel state is not "stationary" or the first characteristic distance $d_1$ is more than the characteristic distance threshold $d_{TH}$, no background model is generated.

Finally, the background model generated in the step S504 or S510 is stored in the background model storing unit 34 (the step S508). When no background model is generated here, nothing new is stored in the background model storing unit 34, and the preceding background model remains. In other words, the fact that no background model is generated means that the preceding background model is generated.

Next, the effects of the present example will be explained. In the present example, the mean value $\mu_{BG}$ and the variance value $\sigma^2_{BG}$, which constitute the background model, are calculated as the weighted mean value and the weighted variance value. Based on the fact that the newer the characteristics I are, the more reliable they become as the background, the weighting coefficient $W_i$ is added so that the latest values are the largest, and the older the values are, the smaller they become. As a result, the most appropriate background model can be obtained. Therefore, highly accurate object detection can be performed.

Example 3

Next, a third example of the present invention will be described. An object detection apparatus of the present example is basically configured identically to the object detecting apparatus of the first example shown in FIG. 1, however, the third example differs from the first example in that the functions of the first characteristic distance calculating unit 23, the background model generating unit 24, the second characteristic distance calculating unit 25, and the background model storing unit 34 are modified.

The background model generating unit 24 performs the same operation as the background model generating unit 24 in the first example shown in FIG. 1, however, instead of assuming a normal distribution and calculating the mean value $\mu_{BG}$ and the variance value $\sigma^2_{BG}$ of the characteristics I as the background model, a plurality of mean values $\mu_{BGi}$, variance values $\sigma^2_{BGi}$, and weighting coefficients ai of the characteristics I are calculated under assumption of mixture of normal distributions. Here, i is the number assigned to each normal distribution. A calculation method such as the EM (expectation-maximization) algorithm is used.

As the background model, the background model storing unit 34 stores as many mean values $\mu_{BGi}$, variance values $\sigma^2_{BGi}$, and weighting coefficients $\alpha_i$, which are the background model generation elements, for $n_{LW}$ number of characteristics over a long period of time as the number of normal distributions. In the background model storing unit 34, the memory unit that stores the background model is provided for each pixel.

From the preceding background models (i.e., the plurality of the mean values $\mu_{BGi}$, the variance values $\sigma^2_{BGi}$, and the weighting coefficients $\alpha_i$) stored in the background model storing unit 34, the first characteristic distance calculating unit 23 selects ones having weighting coefficients $\alpha_i$ not less than a threshold value $\alpha_{TH}$. Then, the characteristic distances $d_1$ from the characteristics I extracted by the characteristic extracting unit 21 are calculated according to the formula (2) and standardized. From a plurality of the calculated characteristic distances $d_1$, a smallest value is selected as a final characteristic distance $d_1$. The degree of similarity increases as the characteristic distance $d_1$ decreases.

From the latest background models (i.e., the plurality of the mean values $\mu_{BGi}$, the variance values $\sigma^2_{BGi}$, and the weighting coefficients $\alpha_i$) stored in the background model storing unit 34, the second characteristic distance calculating unit 25 selects ones having weighting coefficients $\alpha_i$ not less than the threshold value $\alpha_{TH}$. Then, the characteristic distances $d_2$ from the characteristics I extracted by the characteristic extracting unit 21 are calculated according to the formula (3) and standardized. From a plurality of the calculated characteristic distances $d_2$, a smallest value is selected as a final characteristic distance $d_2$. The degree of similarity increases as the characteristic distance $d_2$ decreases.

Figure 7:
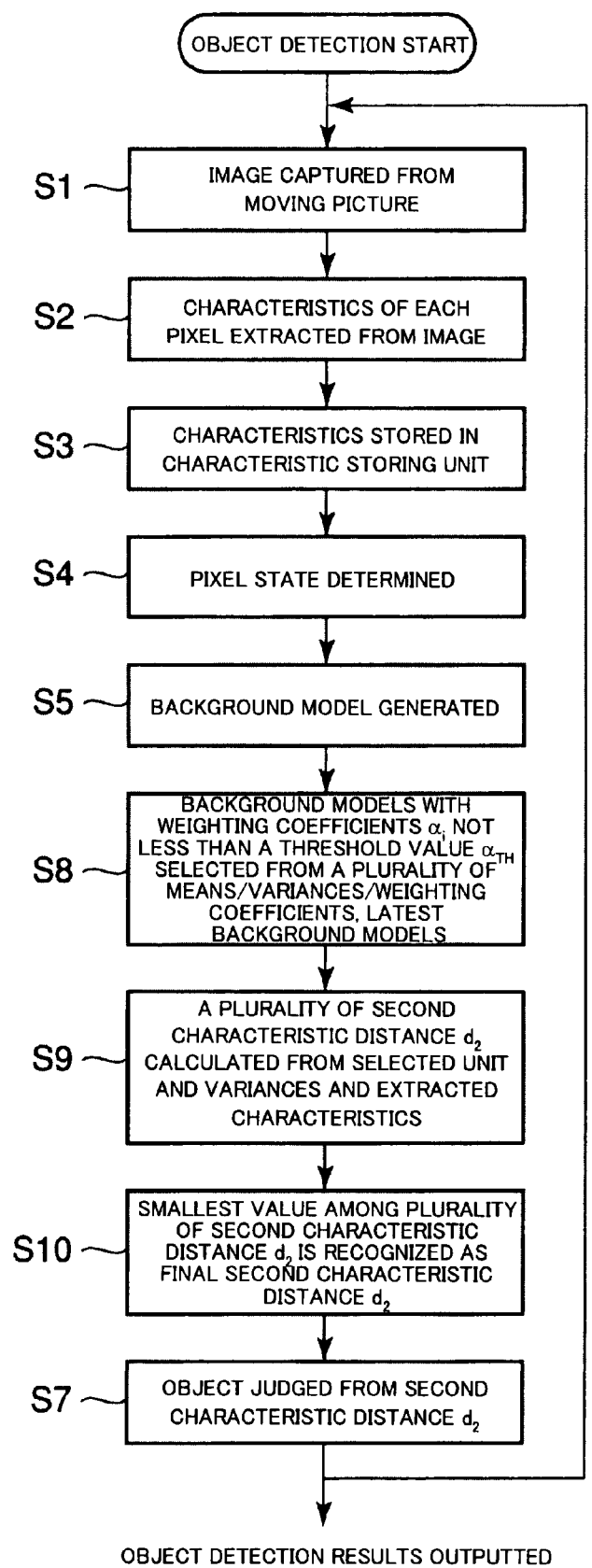
FIG. 7 is a flowchart showing the operation of the third example.
Figure 8:
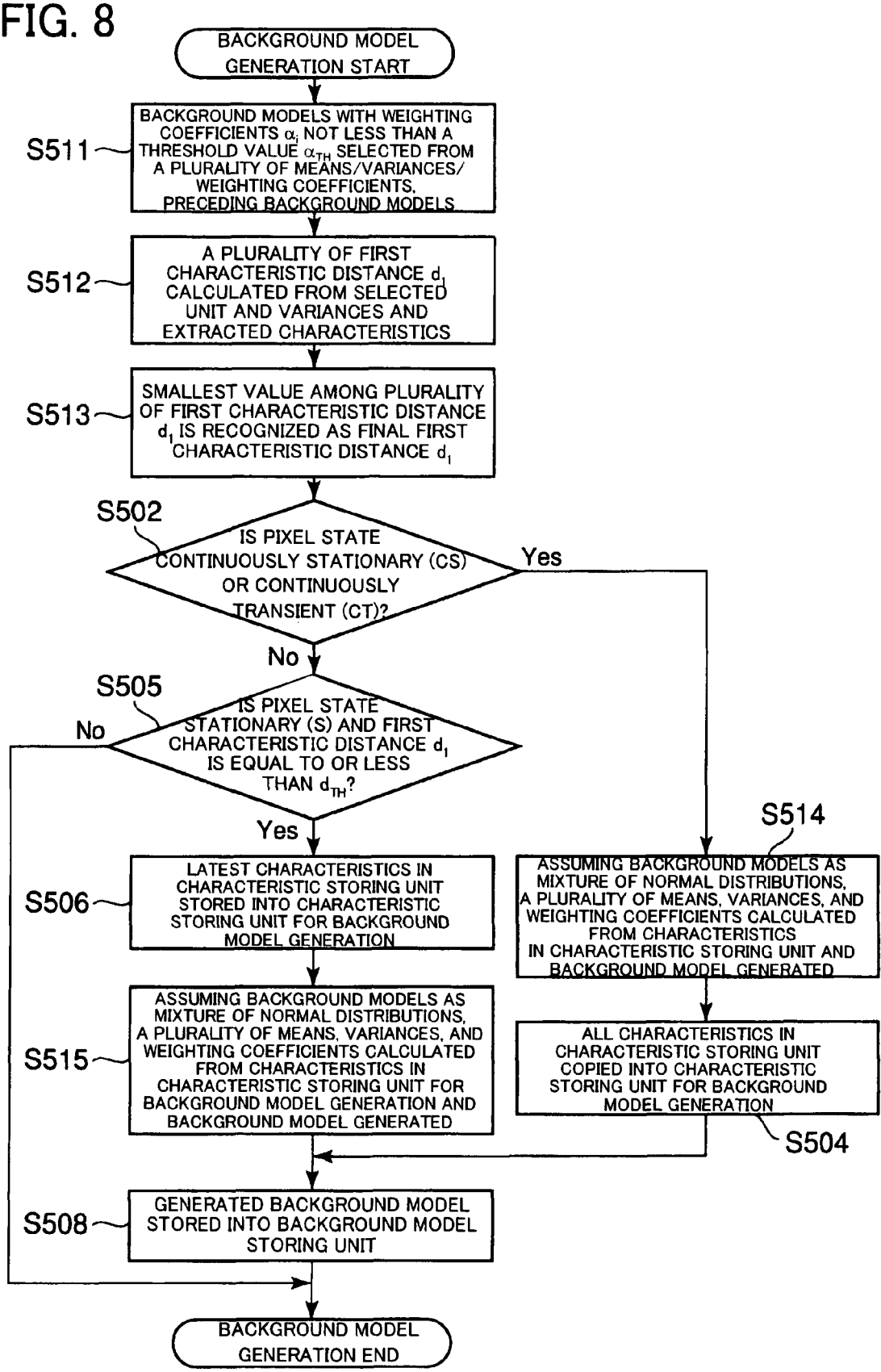
FIG. 8 is a flowchart showing the operation of the third example.

Next, the operation of the object detecting apparatus of the present example will be described with reference to FIGS. 1, 4, 7, and 8. The operation of the present example differs from the first example in that the step S6 is removed from the operation of the first example shown in FIG. 3, the steps S501, S503, and S507 are removed from the operation of the first example shown in FIG. 5, steps S8 to S10 are added as shown in FIG. 7, and steps S511 to S515 are added as shown in FIG. 8. The other steps are identical to the corresponding steps in the first example.

From the preceding background models, i.e., the plurality of the mean values $\mu_{BGi}$, the variance values $\sigma^2_{BGi}$, and the weighting coefficients $\alpha_i$, stored in the background model storing unit 34, the first characteristic distance calculating unit 23 selects background models having weighting coefficients $\alpha_i$ not less than the threshold value $\alpha_{TH}$ (step S511). According to the formula (2), a plurality of the characteristic distances $d_1$ are calculated using the plurality of the mean values $\mu_{BGi}$ and the variance values $\sigma^2_{BGi}$ selected and the characteristics I extracted by the characteristic extracting unit 21 (step S512). A smallest value is selected from the plurality of the characteristic distances $d_1$ calculated as a final characteristic distance $d_1$ (step S513).

The background model generating unit 24 judges whether the pixel state determined by the pixel state determining unit 22 is "continuously stationary" or "continuously transient" (step S502). When it is either "continuously stationary" or "continuously transient," using the EM algorithm, a plurality of the mean values $\mu_{BGi}$, the variance values $\sigma^2_{BGi}$, and the weighting coefficients $\alpha_i$, which are the parameters of mixture of normal distributions, are calculated for the characteristics I stored in the characteristic storing unit 31 as the background models (step S514). Further, all the characteristics I in the characteristic storing unit 31 are copied into the characteristic storing unit 33 for background generation (step S504). When the pixel state is neither "continuously stationary" nor "continuously transient," whether or not the pixel state is "stationary" and whether or not the first characteristic distance $d_1$ is equal to or less than the characteristic distance threshold $d_{TH}$ is determined (step S505).

When the pixel state is "stationary" and the first characteristic distance $d_1$ is not more than the characteristic distance threshold $d_{TH}$, the latest characteristics I in the characteristic storing unit 31 are stored in the characteristic storing unit 33 for background model generation (the step S506). Then, using the EM algorithm, a plurality of the mean values $\mu_{BGi}$, the variance values $\sigma^2_{BGi}$, and the weighting coefficients $\alpha_i$, which are the parameters of mixture of normal distributions, are calculated for the characteristics I stored in the characteristic storing unit 33 for background generation as the background models (the step S5 15). When the pixel state is not "stationary" or the first characteristic distance $d_1$ is more than the characteristic distance threshold $d_{TH}$, no background model is generated.

Finally, the background model generated in the step S504 or S515 is stored in the background model storing unit 34 (the step S508). When no background model is generated here, nothing new is stored in the background model storing unit 34, and the preceding background model remains. In other words, the fact that no background model is generated means that the preceding background model is generated.

In the present example, since the background model is derived from the plurality of the mean values $\mu_{BGi}$, the variance values $\sigma^2_{BGi}$, and the weighting coefficients $\alpha_i$, assuming mixture of normal distributions, instead of assuming a normal distribution and deriving the background model from the mean value $\mu_{BG}$ and the variance value $\sigma^2_{BG}$, the expressiveness (or expressibility) of the model increases and an accurate background model can be obtained. Therefore highly accurate object detection can be performed.

Example 4

Next, a fourth example of the present invention will be described with reference to the drawings. An object detection apparatus of the present example is basically configured identically to the object detecting apparatus of the first example shown in FIG. 1, however, the fourth example differs from the first example in that each function of all the unit except for the image capturing unit 1, the object judging unit 26, and the characteristic variance value storing unit 32 is partially modified.

The characteristic extracting unit 21 extracts a characteristic vector X of each pixel from an image captured by the image capturing unit 1. The characteristic vector X is obtained by multi-dimensionally configuring the combination of, for instance, the intensity, hue, each value of RGB, edge value, optical flow value, and the distance value in a distance image. Basically, characteristics that are stable over time when an object stands stationary and that are unstable over time when the object is in motion should be used. Further, the characteristic vector X can be configured by using the characteristics I of the target pixel and its peripheral pixels as a block. The combination of the characteristic vectors described above can also be used to configure the characteristic vector X.

The characteristic storing unit 31 stores $n_{LW}$ number of the characteristic vectors X in the FIFO buffer over a long period of time. The FIFO buffer is provided for each pixel. The characteristic storing unit 33 for background generation stores $n_{LW}$ number of the characteristic vectors X for background generation in the FIFO buffer over a long period of time. In the characteristic storing unit 33 for background generation, a memory unit that stores the characteristic vector X for background generation is provided for each pixel.

The background model storing unit 34 stores mean vector $m_{BG}$ and covariance matrix $\Sigma_{BG}$, which are the background model generation elements, for the $n_{LW}$ characteristic vectors X over a long period of time as the background model. In the background model storing unit 34, the memory unit that stores the background model is provided for each pixel.

In order to determine whether the characteristic vector X is in a stable state or an unstable state, the pixel state determining unit 22 derives a covariance matrix $\Sigma_{SW}$ for the last $n_{SW}$ number ($n_{SW} < n_{LW}$) of the characteristic vectors X starting from the latest value of the characteristic vector stored in the characteristic storing unit 31 over a short period of time. The variance value $\sigma^2_{SW}$ is obtained from the sum of diagonal components (may be termed "trace") or the maximum value of the diagonal components of the covariance matrices $\Sigma_{SW}$, and stored in the characteristic variance value storing unit 32. Further, the ratio $R_S$ between the numbers of the variance values $\sigma^2_{SW}$ not more than the threshold value $\sigma^2_{TH}$ in the characteristic variance value storing unit 32 and all the data stored is derived according to the formula (1) in order to determine how long the characteristic vectors X have continued to be in a stable state. The ratio $R_S$ indicates the continuity level of the stable state.

Further, using the obtained variance value $\sigma^2_{SW}$ and ratio $R_S$ and according to the pixel state transition diagram shown in FIG. 2, which of the four states the pixel state is in is determined: "stationary,""transient (or moving)," "continuously stationary," and "continuously transient (or moving)." Note that the pixel state indicates the temporal characteristics of the characteristic vector X. "Stationary" indicates that it is stable for a short period of time, "transient" unstable for a short period of time, "continuously stationary" stable for a long period of time, and "continuously transient" unstable for a long period of time.

Next, the transition of the pixel state is described with reference to FIG. 2. In the pixel state transition diagram shown in FIG. 2, the pixel state changes according to the following rule: when the ratio $R_S$ obtained is not less than the threshold value $R_{S\_CS\_TH}$ for the "continuously stationary" state, the pixel state is "continuously stationary" and when it is not more than the threshold value $R_{S\_CT\_TH}$ for the "continuously transient" state, the pixel state is "continuously transient." When the ratio $R_S$ does not correspond to either condition above and the variance value $\sigma^2_{SW}$ is not more than the threshold value $\sigma^2_{TH}$, the pixel state is "stationary." It is "transient" in all the other cases.

Further, the threshold value $R_{S\_CS\_TH}$ for the "continuously stationary" state and the threshold value $R_{S\_CT\_TH}$ for the "continuously transient" state should satisfy the following relationship: $R_{S\_CS\_TH} > R_{S\_CT\_TH}$. Basically, the threshold value $R_{S\_CS\_TH}$ for the "continuously stationary" state is 1.

Here, the ratio $R_S$ is derived by storing the variance values $\sigma^2_{SW}$ in the characteristic variance value storing unit 32, and however, it is also possible to obtain the ratio $R_S$ by storing the results of judging the variance values $\sigma^2_{SW}$ indicating stable or unstable state (the judging results of whether or not the variance value $\sigma^2_{SW}$ is equal to or less than the threshold value $\sigma^2_{TH}$) in the characteristic variance value storing unit 32, and deriving the ratio of the stable states against all the stored data.

The first characteristic distance calculating unit 23 calculates a Mahalanobis distance $D_1^2$ between the characteristic vector X extracted by the characteristic extracting unit 21 and the preceding background model (i.e., the mean vector $m_{BG}$ and the covariance matrix $\Sigma_{BG}$) stored in the background model storing unit 34 according to formula (7).

$$D_1^2(x,y,t) = (X(x,y,t) - m_{BG}(x,y,t-1))^t \Sigma_{BG}^{-1}(x,y,t-1)(X(x,y,t) - m_{BG}(x,y,t-1)) \quad (7) \text{ [Formula 7]}$$

The calculated Mahalanobis distance $D_1^2$ is recognized as the first characteristic distance $d_1$. The degree of similarity increases as the characteristic distance $d_1$ decreases.

The background model generating unit 24 determines a method for generating the background model using the pixel state determined by the pixel state determining unit 22 and the characteristic distance $d_1$ calculated by the first characteristic distance calculating unit 23 as conditions. According to this method, an adaptive background model is generated from the characteristic vectors X in the characteristic storing unit 31 and the characteristic vectors X in the characteristic storing unit 33 for background model generation. When the pixel state is "continuously stationary," the pixel is determined to be a stationary background for a long period of time in the past since the characteristic vector X is stable for a long period of time. Then, the mean vector $m_{BG}$ and the covariance matrix $\Sigma_{BG}$ of the characteristic vector X in the characteristic storing unit 31 are calculated as a background model. After the calculation, all the characteristic vectors X in the character storing unit 31 are copied into the characteristic storing unit 33 for background model generation.

When the pixel state is "continuously transient," the pixel is determined to be a moving background for a long period of time in the past since the characteristic vector X is unstable for a long period of time. Then, the mean vector $m_{BG}$ and the covariance matrix $\Sigma_{BG}$ of the characteristic vector X in the characteristic storing unit 31 are calculated as a background model. After the calculation, all the characteristic vectors X in the character storing unit 31 are copied into the characteristic storing unit 33 for background model generation.

When the pixel state is "stationary" and the characteristic distance $d_1$ calculated by the first characteristic distance calculating unit 23 is not more than the characteristic distance threshold value $d_{TH}$, therefore indicating a high degree of similarity, the characteristic vector X extracted by the characteristic extracting unit 21 is determined to be a background since the characteristic vector X is a reliable value and similar to the background model. Then, the characteristic vector X extracted by the characteristic extracting unit 21, i.e., the latest characteristic vector X in the characteristic storing unit 31, is stored in the characteristic storing unit 33 for background model generation. In other words, the background model elements are updated. Then, the mean value $m_{BG}$ and the covariance matrix $\Sigma_{BG}$ of the characteristic vector X in the characteristic storing unit 33 for background model generation are calculated as a background model. When the determined pixel state and the characteristic distance $d_1$ do not correspond to the above conditions, no background model is generated. In this case, the preceding background model is used.

The second characteristic distance calculating unit 25 calculates a Mahalanobis distance $D_2^2$ between the characteristic vector X extracted by the characteristic extracting unit 21 and the latest background model (i.e., the mean vector $m_{BG}$ and the covariance matrix E BG) stored in the background model storing unit 34 according to formula (8).

$$D_2^2(x,y,t) = (X(x,y,t) - m_{BG}(x,y,t))^t \Sigma_{BG}^{-1}(x,y,t)(X(x,y,t) - m_{BG}(x,y,t)) \quad (8) \text{ [Formula 8]}$$

The calculated Mahalanobis distance $D_2^2$ is recognized as the second characteristic distance $d_2$. The degree of similarity increases as the characteristic distance $d_2$ decreases.

Figure 9:
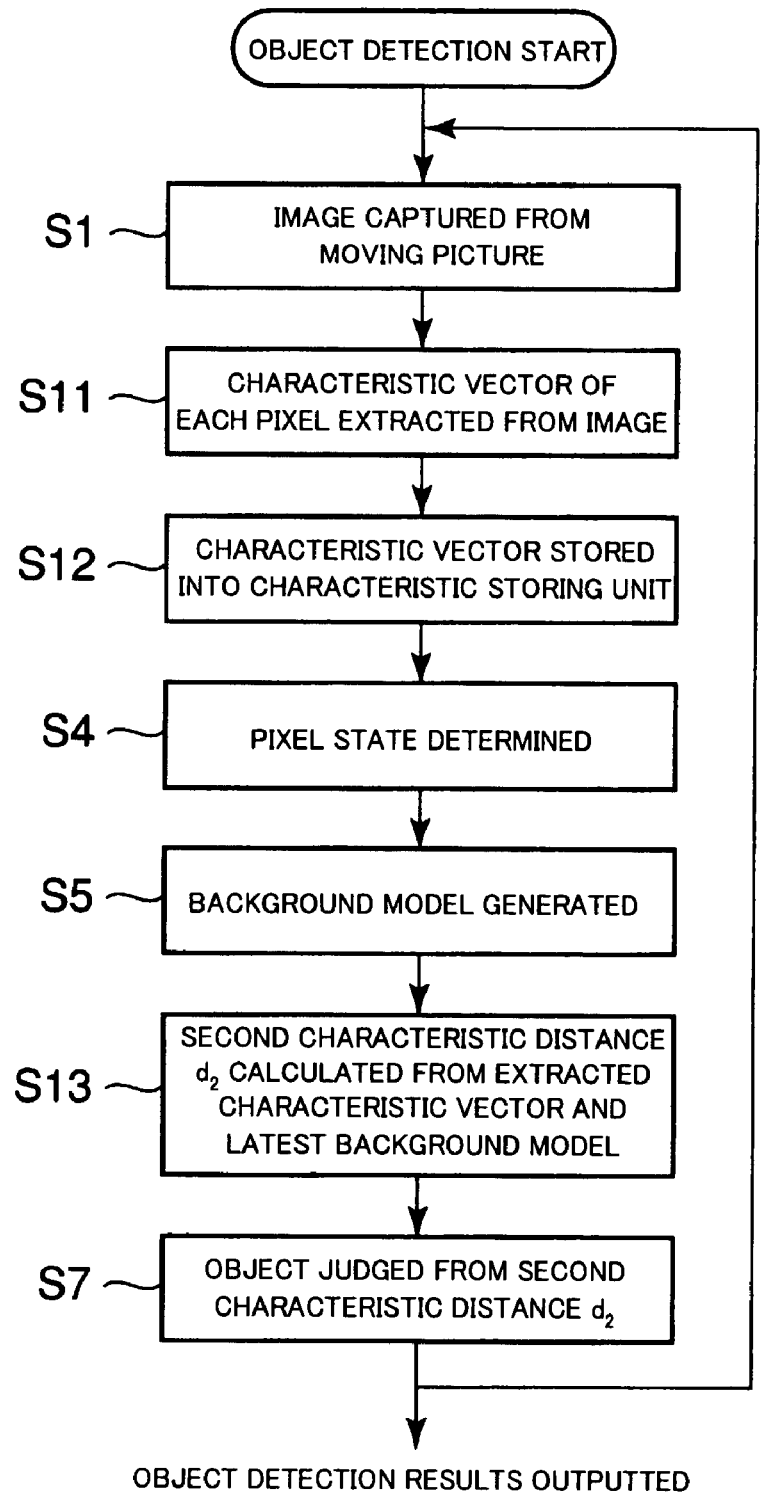
FIG. 9 is a flowchart showing the operation of the fourth example.
Figure 10:
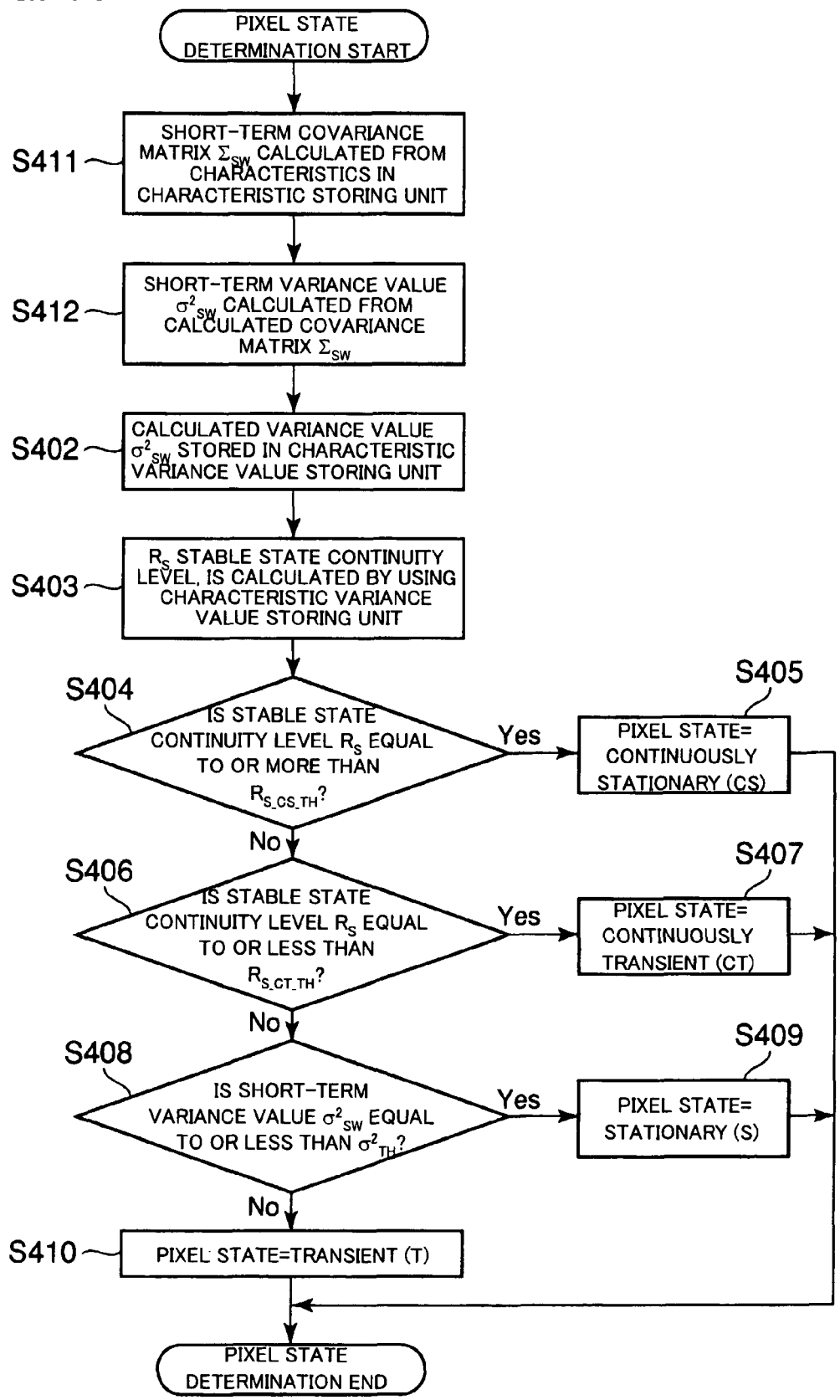
FIG. 10 is a flowchart showing the operation of the fourth example.
Figure 11:
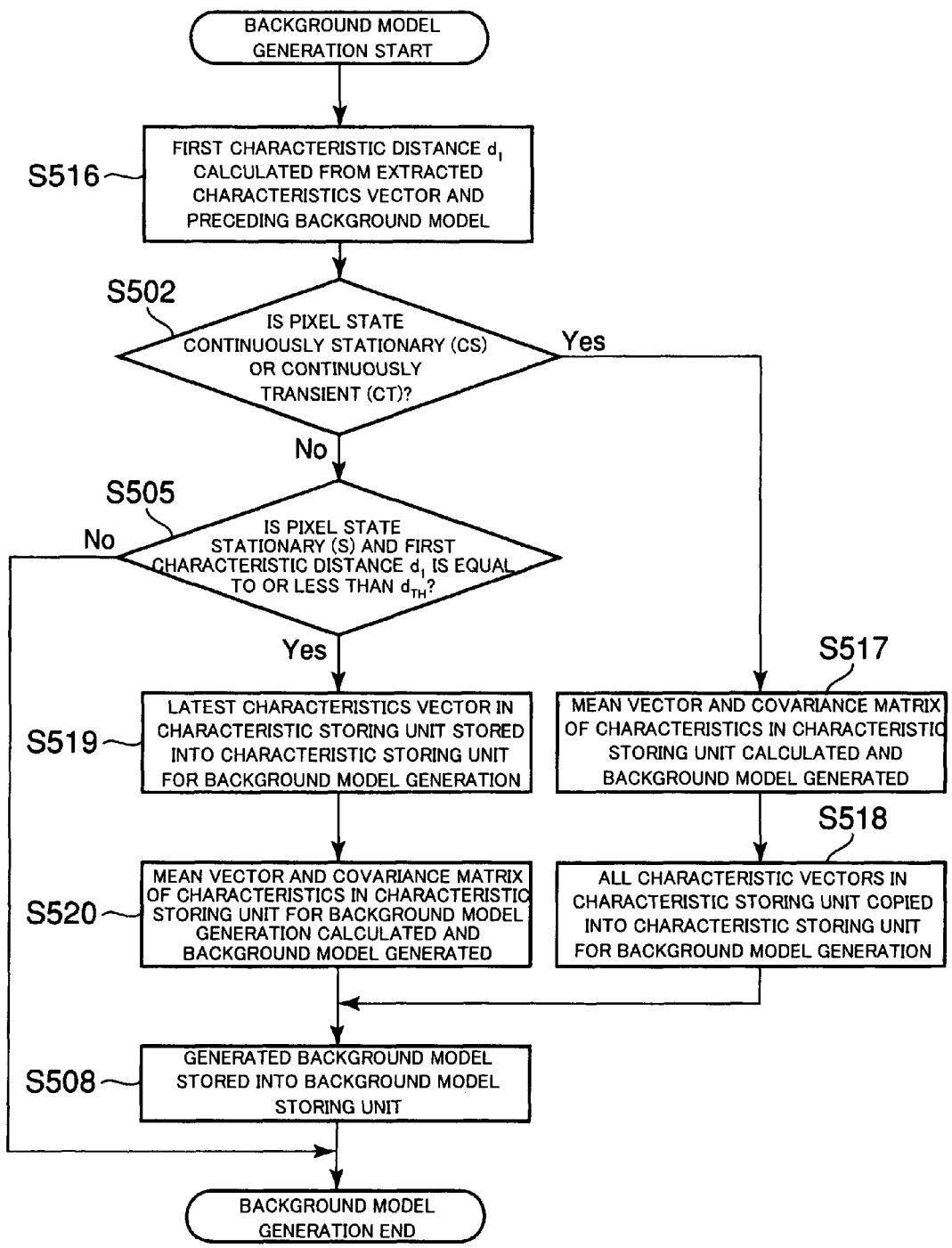
FIG. 11 is a flowchart showing the operation of the fourth example.

Next, the operation of the object detecting apparatus of the present example will be described with reference to FIGS. 1, 9, 10 and 11. The operation of the present example differs from the first example in that the steps S2, S3, S6 are removed from the operation of the first example shown in FIG. 3, the step S401 is removed from the operation of the first example shown in FIG. 4, the steps S501, S503, S504, S506, and S507 are removed from the operation of the first example shown in FIG. 5, steps S11 to 13 are added as shown in FIG. 9, steps S411 and 412 are added as shown in FIG. 10, and steps S516 to 520 are added as shown in FIG. 11. The other steps are identical to the corresponding steps in the first example.

The characteristic extracting unit 21 extracts the characteristic vector X of each pixel from an image captured by the image capturing unit 1 (step S11). Then, the extracted characteristic vector X is stored in the characteristic storing unit 31 (step S12).

The pixel state determining unit 22 calculates the covariance matrix $\Sigma_{SW}$ for the last $n_{SW}$ number of the characteristic vectors X starting from the latest value stored in the characteristic storing unit 3 1 over a short period of time (the step S411). The variance value $\sigma^2_{SW}$ is calculated from the sum of diagonal components or the maximum value of the diagonal components of the calculated covariance matrices $\Sigma_{SW}$ (the step S12).

The first characteristic distance calculating unit 23 calculates the Mahalanobis distance $D_1^2$ using the characteristic vector X extracted by the characteristic extracting unit 21 and the preceding background model (i.e., the mean vector $m_{BG}$ and the covariance matrix $\Sigma_{BG}$) stored in the background model storing unit 34 according to the formula (7). The calculated Mahalanobis distance $D_1^2$ is recognized as the first characteristic distance $d_1$ (the step S516).

The background model generating unit 24 judges whether the pixel state determined by the pixel state determining unit 22 is "continuously stationary" or "continuously transient" (the step S502). When the pixel state is either "continuously stationary" or "continuously transient," the mean vector $m_{BG}$ and the covariance matrix $\Sigma_{BG}$ of the characteristic vector X stored in the characteristic storing unit 31 are calculated as a background model (the step S517). Then, all the characteristic vectors X in the characteristic storing unit 31 are copied into the characteristic storing unit 33 for background model generation (the step S518). When the pixel state is neither "continuously stationary" nor "continuously transient," whether or not the pixel state is "stationary" and whether or not the first characteristic distance $d_1$ is equal to or less than the characteristic distance threshold $d_{TH}$ is determined (the step S505).

When the pixel state is "stationary" and the first characteristic distance $d_1$ is not more than the characteristic distance threshold $d_{TH}$, the latest characteristic vector X in the characteristic storing unit 31 is stored in the characteristic storing unit 33 for background model generation (the step S519), and the mean vector $m_{BG}$ and the covariance matrix $\Sigma_{BG}$ of the characteristic vector X in the characteristic storing unit 33 for background model generation are calculated. Then, the calculated mean vector $m_{BG}$ and the covariance matrix $\Sigma_{BG}$ of the characteristic vector X are recognized as a background model (the step S520). When the pixel state is not "stationary" or the first characteristic distance $d_1$ is more than the characteristic distance threshold $d_{TH}$, no background model is generated.

Finally, the background models generated in the step S518 or S520 is stored in the background model storing unit 34 (the step S508). When no background model is generated here, nothing new is stored in the background model storing unit 34, and the preceding background model remains. In other words, the fact that no background model is generated means that the preceding background model is generated.

Next, the second characteristic distance calculating unit 25 calculates the Mahalanobis distance $D_2^2$ using the characteristic vector X extracted by the characteristic extracting unit 21 and the latest background model (i.e., the mean vector $m_{BG}$ and the covariance matrix $\Sigma_{BG}$) stored in the background model storing unit 34 according to the formula (8). The calculated Mahalanobis distance $D_2^2$ is recognized as the second characteristic distance $d_2$ (the step S13).

In the present example, the determination of the pixel state, the generation of the background model, and the judgment of an object can be performed utilizing more information since one-dimensional characteristics are expanded into the characteristic vector, i.e., multi-dimensional characteristics. As a result, highly accurate object detection can be performed.

Example 5

Figure 12:
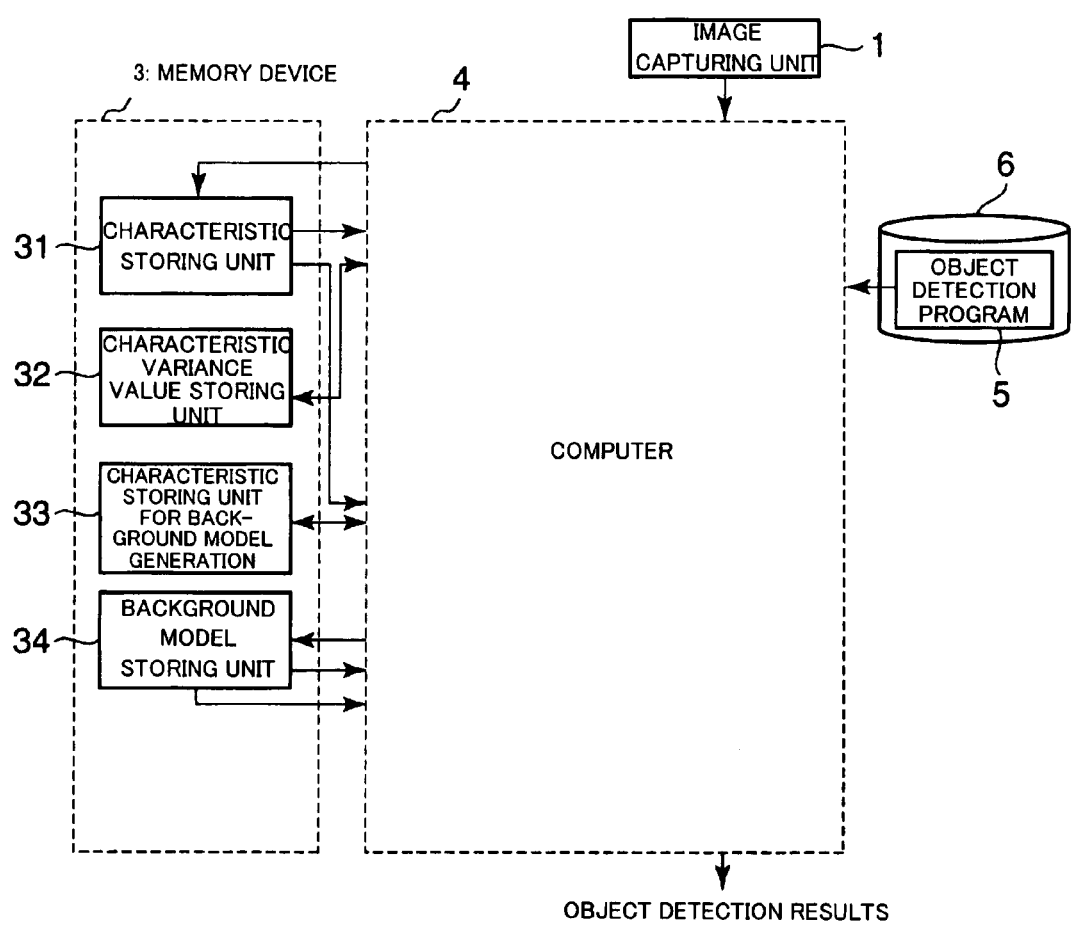
FIG. 12 is a block diagram showing the configuration of the fifth example.

Next, a fifth example of the present invention will be described with reference to the drawings. As shown in FIG. 12, the image capturing unit 1 and the memory device 3 having the characteristic storing unit 31, the characteristic variance value storing unit 32, the characteristic storing unit 33 for background model generation, and the background model storing unit 34, identical to the ones in the first example, are connected to computer 4 in the present example. Further, a computer-readable storage medium 6 that stores an object detection program 5 is connected to the computer 4.

The computer-readable storage medium 6 is constituted by a magnetic disk and semiconductor memory, for instance. The object detection program 5 stored in the computer-readable storage medium 6 is read by the computer 4 at the startup of the computer 4, and controls the operation of the computer 4. Then, the computer 4 functions as the unit 21 to 26 in the data processing device 2 of the first example and performs the processings shown in FIGS. 3 to 5.

In the present example, the object detecting apparatus of the first example is realized by a computer and a program, however, it is possible to realize each object detecting apparatus of the second, third, and fourth examples using a computer and program.

The present invention is suitably applicable to an object detecting apparatus capable of detecting a stationary or moving target object from a changing background in a moving picture with the changing background and a program that realize such an object detecting apparatus with a computer. Further, in the surveillance field where it is necessary to detect an object from a camera and stored images, the present invention is suitably applicable to an apparatus or a function that detects intruder/suspicious person, suspicious object left behind, unlawful entrance at a gate, luggage taken away, congestion, and queue. Further, the present invention can be applied to an input interface that receives the position of an object detected from a camera and stored images, and to a video/image search apparatus/image search function triggered by object detection.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An object detecting apparatus comprising:
   a pixel state determining unit that determines a pixel state indicative of temporal properties of pixel characteristics of an input image;
   a background model generating unit that adaptively generates a background model from said pixel state and a first characteristic distance as conditions to process per each pixel unit, the first characteristic distance being indicative of a degree of similarity between pixel characteristics of the input image and a preceding background model; and
   an object judging unit that judges an object based on a second characteristic distance indicative of a degree of similarity between a generated background model and pixel characteristics of the input image,
   wherein said pixel state has the temporal properties of pixel characteristics of the input image, and is selected in a state from among the following states: a stationary state that is a stable state over a short period of time, a moving state that is an unstable state over a short period of time as compared to a long period of time, a continuously stationary state that is a stable state over a long period of time, and a continuously moving state that is an unstable state over a long period of time.

2. The object detecting apparatus as defined in claim 1, wherein said background model is constituted by a mean of characteristics and a variance of characteristics.

3. The object detecting apparatus as defined in claim 1, wherein a background model is constituted by a weighted mean of characteristics and a weighted variance of characteristics, and
   wherein the weights in said weighted mean and said weighted variance are set so that the latest value is a maximum value, and reduces over elapsed time.

4. The object detecting apparatus as defined in claim 1, wherein a background model is constituted by a plurality of units of characteristics, i.e., a plurality of means, a plurality of variances and a plurality of weighting coefficients under assumption of mixture of normal distributions; background models having weighting coefficients not less than a threshold value are selected from background models; and a smallest characteristic distance among a plurality of characteristic distances derived from characteristics extracted from an input image and a plurality of means and a plurality of variances in the characteristics of said selected background model is recognized as the characteristic distance.

5. The object detecting apparatus as defined in claim 1, wherein characteristics are constituted by multi-dimensional vector; a background model is constituted by multi-dimension of a mean vector and a covariance matrix; and a variance value is a sum of diagonal components or a maximum value of the diagonal components of covariance matrices of characteristics (from a latest value to a value a short while ago) stored in characteristic storing unit.

6. The object detecting apparatus according to claim 1, wherein the pixel state determining unit determines a pixel state by selecting from a plurality of pixel states, each indicating a different state of pixel characteristics over a period of time.

7. The object detecting apparatus according to claim 1, wherein the background model generating unit adaptively generates the background model directly from said pixel state and a characteristic distance as conditions to process per each pixel unit.

8. The object detecting apparatus according to claim 1, wherein the temporal properties of the pixel characteristics are determined from time-sequential characteristics of the input image over time.

9. An object detecting apparatus comprising:
a pixel state determining unit that determines a pixel state indicative of temporal properties of pixel characteristics of an input image;
a background model generating unit that adaptively generates a background model from said pixel state and a first characteristic distance as conditions to process per each pixel unit, the first characteristic distance being indicative of a degree of similarity between pixel characteristics of an input image and a preceding background model; and
an object judging unit that judges an object based on a second characteristic distance indicative of a degree of similarity between a generated background model and pixel characteristics of an input image,
wherein said pixel state determining unit determines a pixel state from variance values based on characteristics (from a latest value to a value a short while ago) stored in characteristic storing unit that time-sequentially stores pixel characteristics of an input image and a ratio $R_S$ between the numbers of variance values not more than a threshold value for a stable state in characteristic variance value storing unit that time-sequentially stores said variance values and all stored data.

10. The object detecting apparatus as defined in claim 9, wherein said pixel state determining unit determines that said pixel state is continuously stationary when the ratio $R_S$ is not less than a threshold for a continuously stationary state, and a continuously moving state when said ratio $R_S$ is not more than a threshold value for a continuously moving state, and
wherein, when said pixel state is neither continuously stationary nor continuously moving, said pixel state determining unit determines that said pixel state is stationary when a variance value is not more than the threshold value for a stable state, and moving when said variance value is more than said threshold value for a stable state.

11. The object detecting apparatus as defined in claim 9, wherein:
said background model generating unit judges that said pixel state is a stationary background when the pixel state is continuously stationary, generates a background model from characteristics stored in characteristic storing unit that time-sequentially stores pixel characteristics of an input image, and copies all characteristics stored in said characteristic storing unit into characteristic storing unit for background model generation,
said background model generating unit judges that said pixel state is a moving background when the pixel state is continuously moving, generates a background model from characteristics stored in said characteristic storing unit, and copies all characteristics stored in said characteristic storing unit into said characteristic storing unit for background model generation,
said background model generating unit judges that pixel characteristics of an input image are a background when said pixel state is stationary and the first characteristic distance that indicates a degree of similarity between pixel characteristics of said input image and the preceding background model is not more than a threshold value, indicating a high degree of similarity, stores latest characteristics stored in said characteristic storing unit into said characteristic storing unit for background model generation, and generates the background model from characteristics stored in said characteristic storing unit for background model generation, and
no background model is generated and the preceding background model is utilized by the object judging unit when a pixel state does not meet any of the above conditions.

12. An object detecting apparatus that judges an object by dividing an image, comprising:
an image dividing unit that divides an input image;
a temporal characteristic determining unit that determines temporal characteristics of an image per divided image unit; and
an image unit specifying unit that analyzes temporal characteristics of a plurality of image units and specifies an image unit in which an object exists,
wherein, when analyzing temporal characteristics of a plurality of image units, said image unit specifying unit extracts distinctive features of parts with similarity in temporal properties to each other from a time sequence of characteristic information obtained per image unit, and
wherein the temporal characteristics have one of following characteristics selected from among the following states: a stable state over a short period of time, an unstable state over a short period of time as compared to a long period of time, a stable state over a long period of time, and an unstable state over a long period of time.

13. The object detecting apparatus as defined in claim 12, wherein the temporal characteristic determining unit derives the temporal characteristics from temporal transition information in a state determined by the relationship between a degree of temporal stability of characteristic information obtained per image unit and a continuity degree how long said degree of temporal stability continues.

14. The object detecting apparatus as defined in claim 13, wherein the characteristic information includes at least one of the following information of an image unit selected from the group consisting of the intensity, hue, each value of RGB (red green blue color model), edge value, optical flow value, and the distance value in a distance image.

15. The object detecting apparatus as defined in claim 12, wherein, when analyzing temporal characteristics of a plurality of image units, said image unit specifying unit recognizes characteristic information different from said distinctive features as an image unit in which an object exists.

16. The object detecting apparatus as defined in claim 12, wherein said image unit is a pixel.

17. The object detecting apparatus according to claim 12, wherein the temporal characteristics are selected from among a choice of the stable state over a short period of time, the unstable state over the short period of time as compared to the long period of time, the stable state over the long period of time, and the unstable state over the long period of time.

18. A method for detecting an object, the method comprising:
a pixel state having temporal properties of pixel characteristics of an input image;
generating adaptively a background model using said pixel state and a characteristic distance that indicates a degree of similarity between pixel characteristics of an input image and a preceding background model as conditions per pixel unit; and
judging an object based on a characteristic distance that indicates a degree of similarity between a generated background model and the pixel characteristics of the input image,
wherein a pixel state has the temporal properties of the pixel characteristics of the input image, and is selected from the following states: a stationary state that is a stable state over a short period of time as compared to a long period of time, a moving state that is an unstable state over a short period of time, a continuously stationary state that is a stable state over a long period of time, and a continuously moving state that is an unstable state over a long period of time.

19. The method for detecting an object as defined in claim 18, wherein the background model is constituted by a mean of characteristics and a variance of characteristics.

20. The method for detecting an object as defined in claim 18, wherein the background model is constituted by a weighted mean of characteristics and a weighted variance of characteristics; and the weights in said weighted mean and said weighted variance are set so that the latest value is largest, and the older a value is, the smaller it becomes.

21. The method for detecting an object as defined in claim 18, wherein a background model is constituted by a plurality of units of characteristics i.e., a plurality of means, a plurality of variances, and a plurality of weighting coefficients under assumption of mixture of normal distributions; a background model having weighting coefficients not less than a threshold value is selected from the background models; and a smallest characteristic distance among a plurality of characteristic distances derived from characteristics extracted from an input image and a plurality of characteristic distance obtained from a plurality of means and variances of said selected background model is recognized as the characteristic distance.

22. The method for detecting an object as defined in claim 18 wherein characteristics are constituted by multi-dimensional vector; a background model is constituted as multi-dimension by a mean vector and a covariance matrix; and a variance value is a sum of diagonal components of covariance matrices or the maximum value of the diagonal components of characteristics (from a latest value to a value a short while ago) stored in characteristic storing unit.

23. The method according to claim 18, wherein the pixel state is selected from among the following four pixel states: the stationary state that is the stable state over the short period of time as compared to the long period of time, the moving state that is the unstable state over the short period of time, the continuously stationary state that is the stable state over the long period of time, and the continuously moving state that is the unstable state over the long period of time.

24. A method for detecting an object, the method comprising:
a pixel state having temporal properties of pixel characteristics of an input image;
generating adaptively a background model using said pixel state and a characteristic distance that indicates a degree of similarity between pixel characteristics of an input image and a preceding background model as conditions per pixel unit; and
judging an object based on a characteristic distance that indicates a degree of similarity between a generated background model and the pixel characteristics of the input image, wherein a pixel state is determined from variance values based on characteristics (from a latest value to a value a short while ago) stored in characteristic storing unit that time-sequentially stores pixel characteristics of an input image and a ratio $R_S$ between the numbers of variance values not more than a threshold value for a stable state in characteristic variance value storing unit that time-sequentially stores said variance values and all stored data in the determining of the pixel state.

25. The method for detecting an object as defined in claim 24, wherein, in the determining of the pixel state, a pixel state is determined to be continuously stationary when the ratio $R_S$ is not less than a threshold for a continuously stationary state, and continuously moving when said ratio $R_S$ is not more than a threshold value for a continuously moving state; and
when a pixel state is determined to be neither continuously stationary nor continuously moving, a pixel state is determined to be stationary when a variance value is not more than a threshold value for a stable state, and moving when said variance value is more than said threshold value for a stable state.

26. The method for detecting an object as defined in claim 24, wherein the generating of the background model comprises a pixel state is judged to be a stationary background when the pixel state is continuously stationary, a background model is generated from characteristics stored in characteristic storing unit that time-sequentially stores pixel characteristics of an input image, and all characteristics stored in said characteristic storing unit are copied into characteristic storing unit for background model generation,
wherein the pixel state is judged to be a moving background when the pixel state is continuously moving, a background model is generated from characteristics stored in said characteristic storing unit, and all characteristics stored in said characteristic storing unit are copied into said characteristic storing unit for background model generation, and
wherein the pixel characteristics of the input image are judged to be a background when a pixel state is stationary and a characteristic distance that indicates a degree of similarity between pixel characteristics of an input image and a preceding background model is not more than a threshold value, indicating a high degree of similarity, latest characteristics stored in said characteristic storing unit are stored into said characteristic storing unit for background model generation, and a background model is generated from characteristics stored in said characteristic storing unit for background model generation; and no background model is generated and a preceding background model is utilized when a pixel state does not meet any of the above conditions.

27. A method for detecting an object, in which an object is judged by dividing an image, comprising:
dividing an input image;
determining temporal characteristics of an image per divided image unit; and
specifying an image unit by analyzing temporal characteristics of a plurality of image units and specifying image units in which an object exists per image unit, wherein the temporal characteristics is selected from following characteristics: a stable state over a short period of time, an unstable state over a short period of time as compared to a long period of time, a stable state over a long period of time, and an unstable state over a long period of time.

28. The method for detecting an object as defined in claim 27, wherein the temporal characteristic determining comprising temporal characteristics derived from temporal transition information in a state determined by a relationship between a degree of temporal stability of characteristic information obtained per image unit and a continuity degree how long said degree of temporal stability continues.

29. The method for detecting an object as defined in claim 27, wherein, when the temporal characteristics of a plurality of image units are analyzed in the specifying of the image unit, distinctive features of parts with similarity in temporal properties to each other are extracted from the time sequence of characteristic information obtained per image unit, and
wherein the characteristic information different from said distinctive features is recognized as an image unit in which an object exists.

30. The method for detecting an object as defined in claim 27, wherein the image unit is a pixel.

31. An object detection program, stored in a non-transitory computer readable medium, having a computer execute a method comprising:
a pixel state determination processing, executable by a processing unit of the computer, that determines a pixel state having temporal properties of pixel characteristics of an input image for display on a display device;
a background model generation processing, executable by the processing unit, that adaptively generates a background model using said pixel state and a characteristic distance that indicates a degree of similarity between pixel characteristics of said input image and a preceding background model as conditions per pixel unit; and
an object judgment processing, executable by the processing unit, that judges an object based on a characteristic distance that indicates a degree of similarity between a generated background model and pixel characteristics of an input image,
wherein the temporal properties is selected from following properties: a stable state over a short period of time, an unstable state over a short period of time as compared to a long period of time, a stable state over a long period of time, and an unstable state over a long period of time.

32. An object detection program, stored in a non-transitory computer readable medium, having a computer execute a method comprising:
a pixel state determination processing, executable by a processing unit of the computer, that determines a pixel state having temporal properties of pixel characteristics of an input image for display on a display device;
a background model generation processing, executable by the processing unit, that adaptively generates a background model using said pixel state and a characteristic distance that indicates a degree of similarity between pixel characteristics of said input image and a preceding background model as conditions per pixel unit; and
an object judgment processing, executable by the processing unit, that judges an object based on a characteristic distance that indicates a degree of similarity between a generated background model and pixel characteristics of an input image, wherein the pixel state determination processing comprises the pixel state being determined from variance values based on characteristics (from a latest value to a value a short while ago) stored in characteristic storing unit that time-sequentially stores pixel characteristics of an input image and a ratio $R_S$ between the numbers of variance values not greater than a threshold value for a stable state in characteristic variance value storing unit that time-sequentially stores said variance values and all stored data.

33. The object detection program as defined in claim 32, wherein the pixel state determination processing comprises a pixel state being determined to be continuously stationary when a ratio $R_S$ is not less than a threshold for a continuously stationary state, and continuously moving when said ratio $R_S$ is not more than a threshold value for a continuously moving state; and when a pixel state is determined to be neither continuously stationary nor continuously moving, a pixel state is determined to be stationary when a variance value is not more than a threshold value for a stable state, and moving when said variance value is more than said threshold value for a stable state.

34. The object detection program as defined in claim 32, wherein the background model generation processing comprises:
when a pixel state is continuously stationary, the background model is generated from characteristics stored in characteristic storing unit that time-sequentially stores pixel characteristics of an input image, and all characteristics stored in said characteristic storing unit are copied into characteristic storing unit for the background model generation;
when a pixel state is continuously moving, the background model is generated from characteristics stored in said characteristic storing unit, and all characteristics stored in said characteristic storing unit are copied into said characteristic storing unit for background model generation;
when the pixel state is stationary and a characteristic distance that indicates a degree of similarity between pixel characteristics of an input image and a preceding background model is not more than a threshold value, indicating a high degree of similarity, latest characteristics stored in said characteristic storing unit are stored into said characteristic storing unit for background model generation, and a background model is generated from characteristics stored in said characteristic storing unit for background model generation; and
no background model is generated and a preceding background model is utilized when the pixel state does not meet any of the above conditions.

35. An object detection program, stored in a non-transitory computer readable medium, having a computer that judges an object by dividing an image execute a method, comprising:
an image division processing, executable on a processor of the computer, that divides an input image to display on a display device;
a temporal characteristic determination processing, executable on the processor, that determines temporal characteristics of an image per divided image unit; and
an image unit specification processing, executable on the processor, that analyzes temporal characteristics of a plurality of image units and that specifies an image unit in which an object exists per image unit,
wherein the temporal characteristics is selected from following characteristics: a stable state over a short period of time, an unstable state over a short period of time as compared to a long period of time, a stable state over a long period of time, and an unstable state over a long period of time.

36. The object detection program as defined in claim 35, wherein the temporal characteristic determination processing comprises the temporal characteristics being derived from temporal transition information in a state determined by the relationship between a degree of temporal stability of characteristic information obtained per image unit and a continuity degree of a length of time that said degree of temporal stability continues.

37. The object detection program as defined in claim 35, wherein the image unit specification processing comprises, when temporal characteristics of a plurality of image units are analyzed, distinctive features of parts with similarity in temporal properties to each other are extracted from the time sequence of characteristic information obtained per image unit;

and characteristic information different from said extracted distinctive features is recognized as an image unit in which an object exists.

38. An object detecting apparatus comprising:
- a pixel state determining unit that determines a pixel state indicative of temporal properties of pixel characteristics of an input image;
- a background model generating unit that adaptively generates a background model from said pixel state and a first characteristic distance as conditions to process per each pixel unit, the first characteristic distance being indicative of a degree of similarity between pixel characteristics of an input image and a preceding background model; and
- an object judging unit that judges an object based on a second characteristic distance indicative of a degree of similarity between a generated background model and pixel characteristics of an input image, wherein:
- the background model generating unit generates the background model comprising an updated background model when the pixel state is stationary and the first characteristic distance is equal to or less than a characteristic distance threshold, and
- the object judging unit judges the object based on the second characteristic distance indicative of the degree of similarity between the generated background model and the pixel characteristics of the input image, the generated background model being either the updated background model when the pixel state is stationary and the first characteristic distance is equal to or less than a characteristic distance threshold, or the preceding background model when the pixel state is not stationary or when the first characteristic distance is more than the characteristic distance threshold.

* * * * *